3,574,954

OPTICAL EDUCATIONAL TOY

BACKGROUND OF THE INVENTION

The present invention pertains to optical educational toys and more particularly to such toys which permit both optical experimentation and construction of optical instruments.

Conventional optical educational toys are limited in didactic value because they are normally constructed of parts which are specifically designed for specific optical instruments and are not interchangeable to permit the construction of various optical instruments. Thus, the education value of a camera, for instance, is limited to the operation of the specific camera, and a true understanding of the basic elements that form the camera is not easily achieved.

SUMMARY OF THE INVENTION

Accordingly, it is an object of the present invention to provide an optical educational toy comprised of individual parts to permit the construction of various optical instruments as well as to permit basic optical experimentation.

Another object of the present invention is to provide telescoping tube elements with an optical educational toy to permit movable and secure support for optical parts.

The present invention has another object in that the optical parts of an optical educational toy may be assembled to form a single lens reflex camera.

One advantage of the present invention is that the optical parts constituting the optical educational toy may be used to construct various optical instruments such as telescopes and cameras.

Another advantage of the educational toy according to the present invention is that a camera has a spring-loaded rotatable shutter element having a slit diaphragm and a spring-loaded mirror connected with the shutter element through a releasable locking device and that a release button is provided to cause the mirror to move along with the shutter element to a position where the locking device is automatically released to permit the shutter element to snap back and expose the film.

The present invention is generally characterized in an optical educational toy having lens means, diaphragm means and mounting means for the lens means and diaphragm means and comprising the improvement of tubular means for receiving the mounting means and movably supporting the mounting means in axial alignment therewith.

Further objects and advantages of the present invention will become apparent from the description of the preferred embodiments as shown in the accompanying drawings.

BRIEF DESCRIPTION OF THE DRAWINGS

FIG. 1 is a side elevational view of a plurality of lenses for use with the present invention.

FIG. 2 is a perspective view of a mount according to the present invention.

5 is a perspective view of the two halves of another tube element for use with the present invention.

Figure 6:
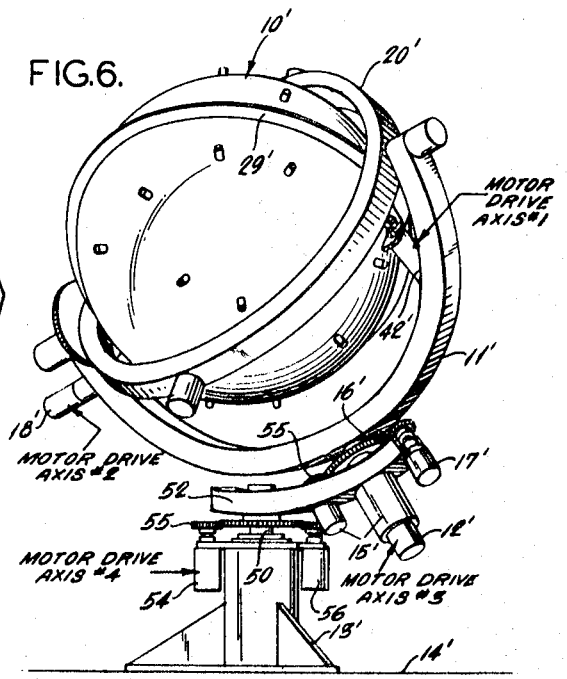

FIG. 6 is a side elevational view, in section, of a Kepler telescope constructed in accordance with the present invention.

FIG. 7 is a perspective view of a camera constructed in accordance with the present invention.

FIGS. 8, 9, 10 and 11 are side elevational views, in section, of the camera of FIG. 7 during various stages of operation.

Figure 12:
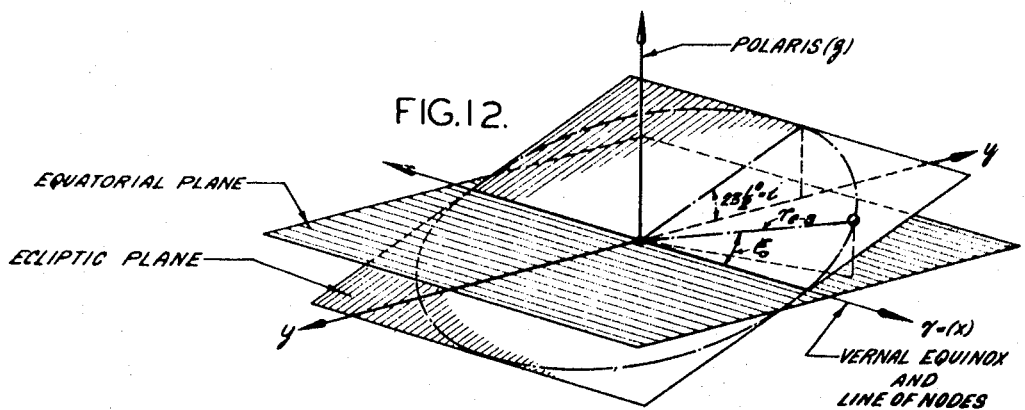

FIG. 12 is a front view of a mirror support for use with the camera of FIG. 7.

Figure 13:
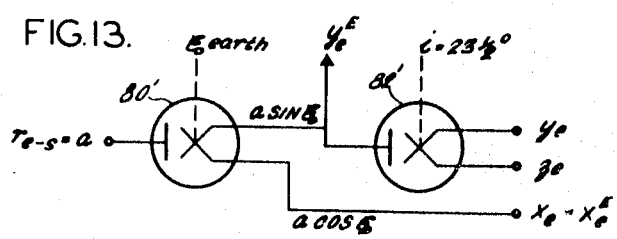

FIG. 13 is a front view of a shutter element for use with the camera of FIG. 7.

DESCRIPTION OF THE PREFERRED EMBODIMENTS

In a preferred design of an educational toy according to the present invention, at least two groups of tube elements of differing diameters may be telescoped into one another, may be assembled without use of intermediate pieces and may comprise two half shells which may be held together by engaging bulges and depressions or by a screw collar ring. Furthermore, the edges of the two half shells of a tube element lying on top of one another engage in a lighttight manner and prevent shifting. Furthermore, one end of the tube elements may have a conical flange whose inside diameter is equal to the outside diameter of the tube element.

The educational toy according to the invention, comprises at least two convex lenses made of the same transparent material whose focal lengths have a 2:1 relationship, and the lens with the smaller focal length has a smaller diameter than the lens with the greater focal length. A concave lens having a diameter equal to the above mentioned larger convex lens is also provided and together with the convex lens forms an achromatic lens assembly. An additional convex lens and concave lens of approximately the same diameter may be provided to form a further achromatic lens assembly having a diameter and a focal length greater than the diameter and focal length of the previously mentioned convex lenses.

In FIG. 1 a set of lenses is illustrated and comprises five basic types of lenses for use with the present invention individually or in combination. A negative or concave lens 1 has a focal length $f_1$ of $-112.1$ mm. A positive or convex lens 2 has the same diameter as lens 1 and has a focal length $f_2$ of 61.1 mm. Lenses 1 and 2 are spaced and aligned in such a manner with respect to their optical characteristics that, when assembled, they form an achromatic lens assembly having a focal length $f_{1,2}$ of 131.5 mm. A further positive or convex lens 3 of a smaller diameter than lenses 1 and 2 has a focal length $f_3$ of 30 mm. By utilizing a pair of lenses 30a color corrected reversal lens assembly providing image reversal and a focal length $f_{3,3}$ of 30 mm. can be formed. Another convex lens 4 is provided having a diameter smaller than that of lens 3 and a focal length $f_4$ of 15 mm. The two positive lenses 3 and 4 are made of the same material and can be arranged together to form a Huygenian eyepiece with a focal length $f_{3,4}$ of 20 mm. A fifth lens in the form of a negative or concave lens 5 has a diameter equal to the diameter of the lens 3 and a focal length $f_5$ of $-43.9$. Lenses 3 and 5 are constructed and aligned in relation to one another with regard to their optical characteristics so that if combined they will form an achromatic lens assembly with a focal length $f_{3,5}$ of 71.5 mm.

Lenses 2, 3 and 4 may be constructed preferably from PLEXIGUM 7N of an optical quality having a refractive index of $n=1.492$ and an abbe number of 58.2. Lenses 1 and 5 may be constructed, for example, of Polystyrene VI of optical quality having a refractive index of $n-1.589$ and an abbe number of 30.6.

As can be seen from FIG. 1, lenses 1—5 have rectangularly shaped bearing edges 6 and 7 with which they may be inserted into corresponding grooves, mounts or tube elements to be described hereinafter. Lenses 1 and 2 have mating edges 8 and 9 that fit into one another and engage with one another whenever the above mentioned achromatic lens assembly is formed from these two lenses.

In FIG. 2 a mount 11 for receiving lenses, diaphragms and other optical parts is shown and comprises two half shells 12 and 13 which are assembled with the help of mating pegs and holes engaging with one another and arranged on the edges lying on top of one another. Mount 11 has a smooth surface on its exterior and grooves 14 on its interior, and bearing edges 6 and 7 of lenses 3 or 5, for example, can be inserted into one of the half shells when the mount is disassembled and the other half shell may be replaced to secure the lenses.

Figure 3:
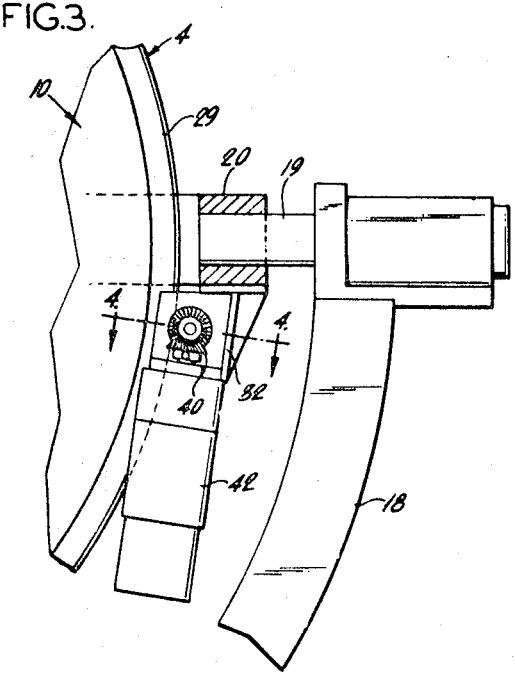
FIG. 3 is a perspective view of a diaphragm according to the present invention.

FIG. 3 shows a simple disc diaphragm 15 having a diaphragm opening 16, and diaphragm 15 may also be in-

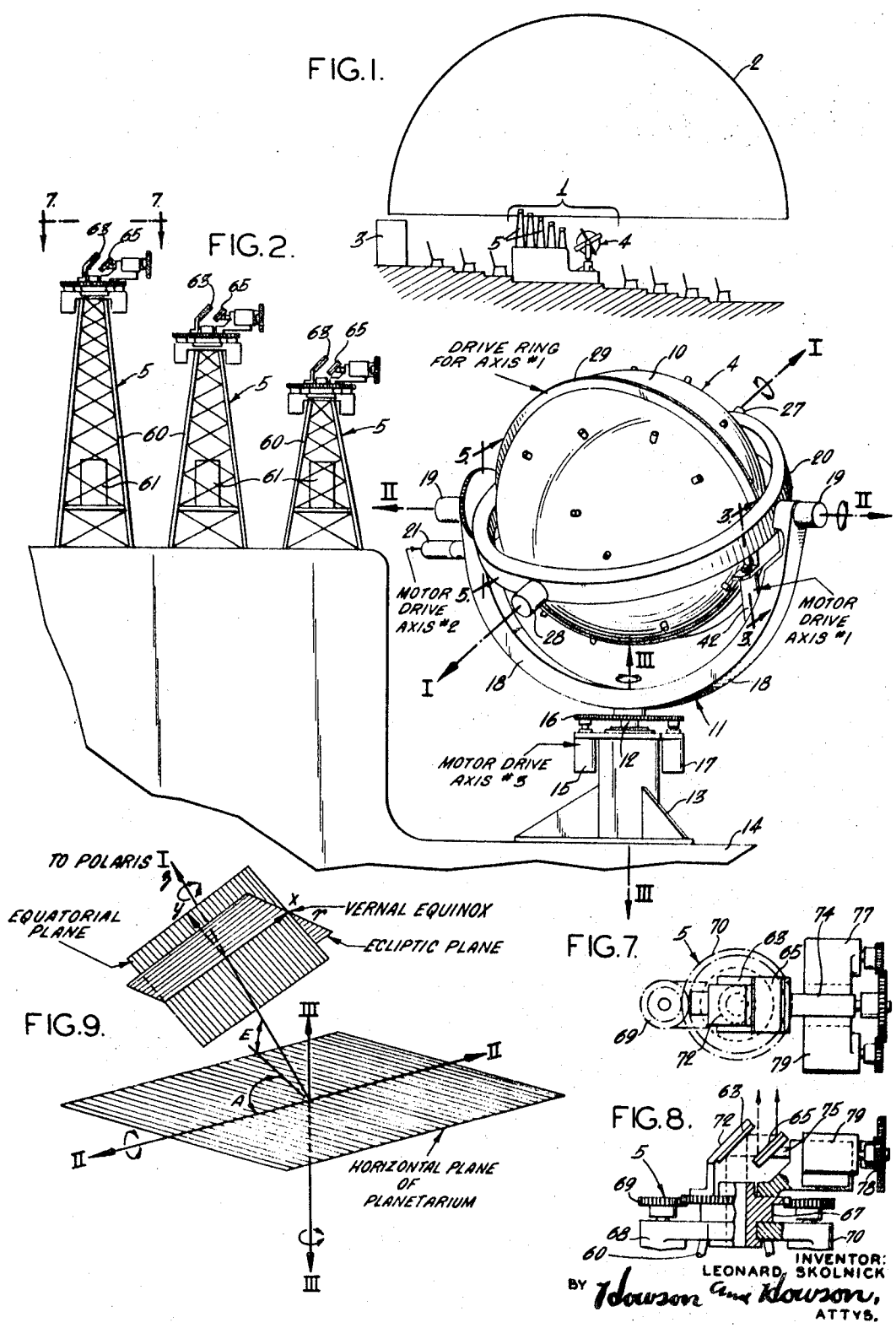

Patented April 13, 1971

3,574,955

10 Sheets-Sheet 2

INVENTOR:
LEONARD SKOLNICK

BY Howson & Howson
ATTYS.

Patented April 13, 1971

3,574,955

10 Sheets-Sheet 3

INVENTOR:
LEONARD SKOLNICK
BY
Howson & Howson,
ATTYS.

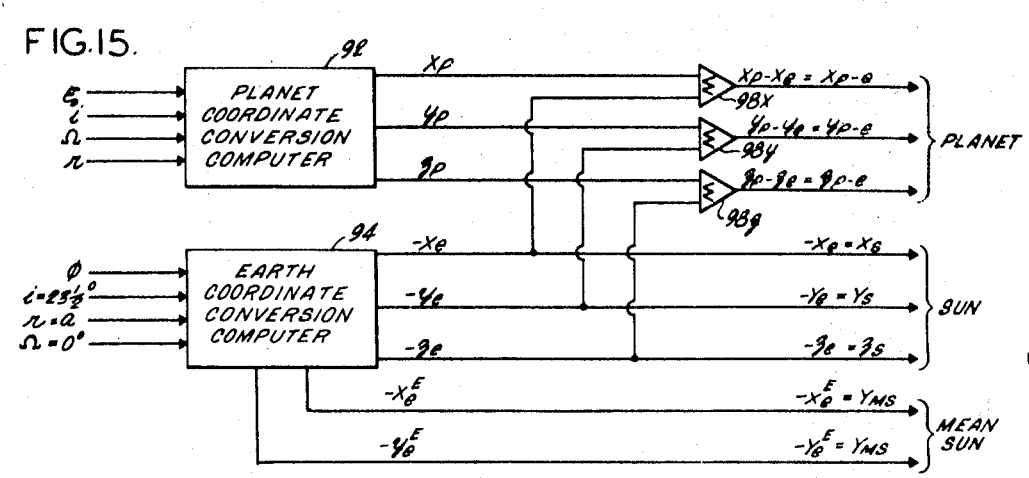
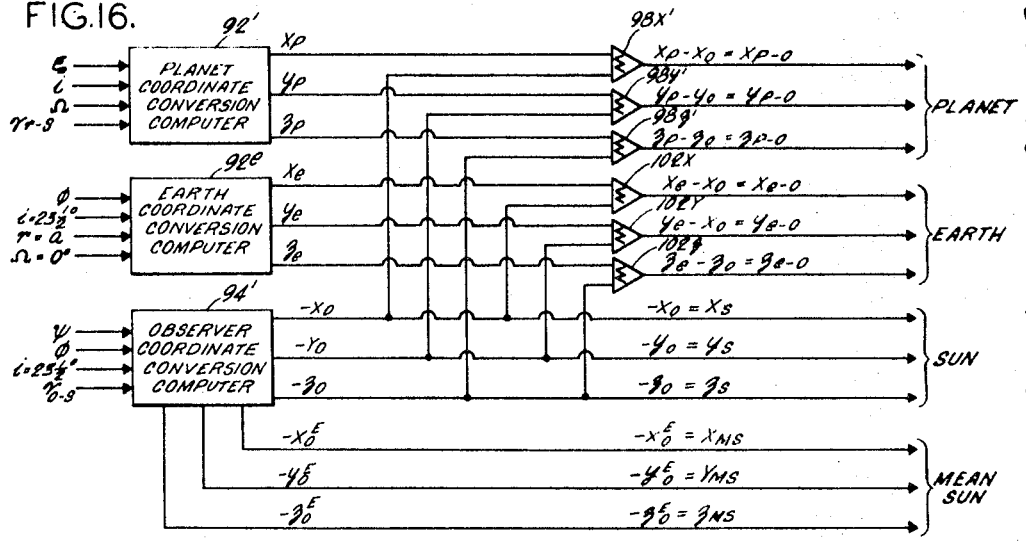
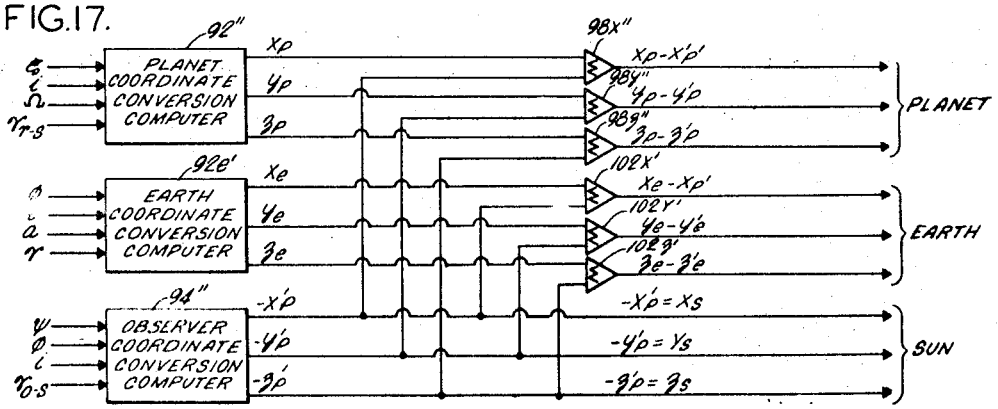
INVENTOR:
LEONARD SKOLNICK

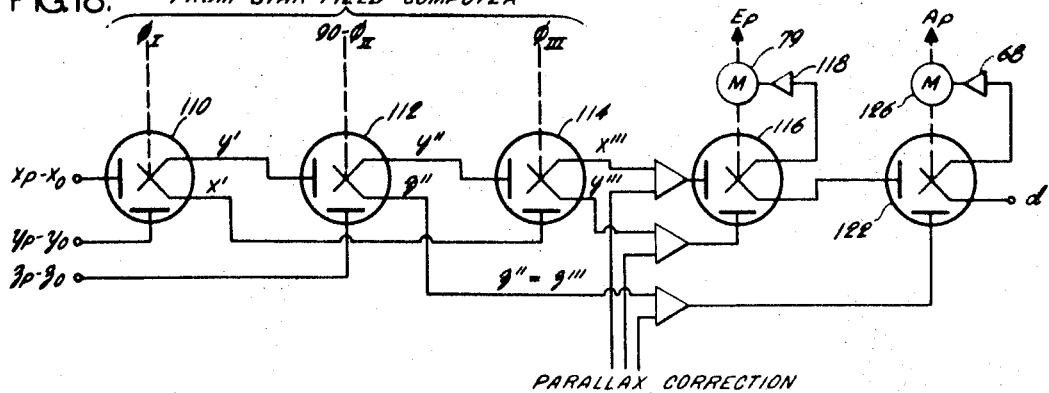
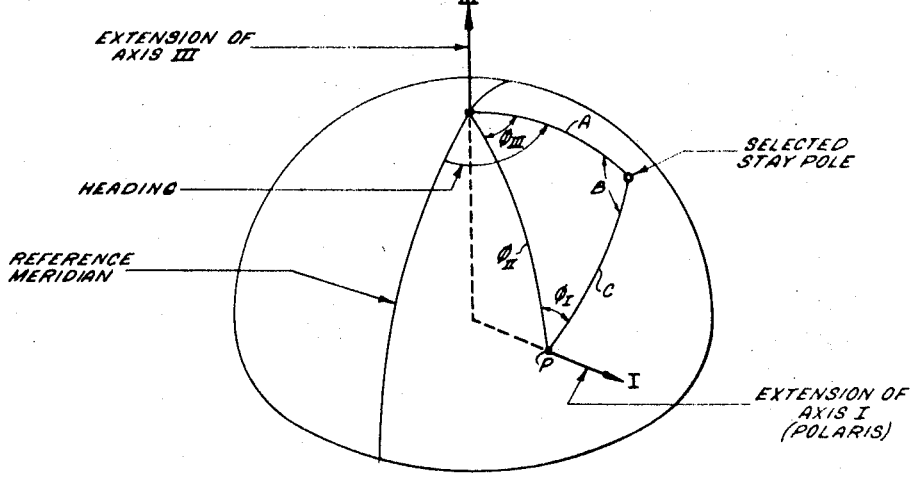
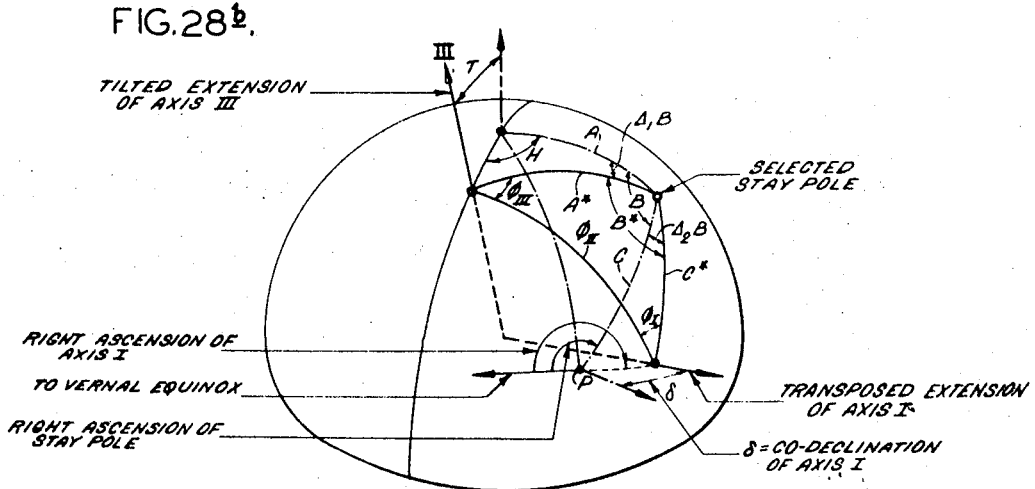

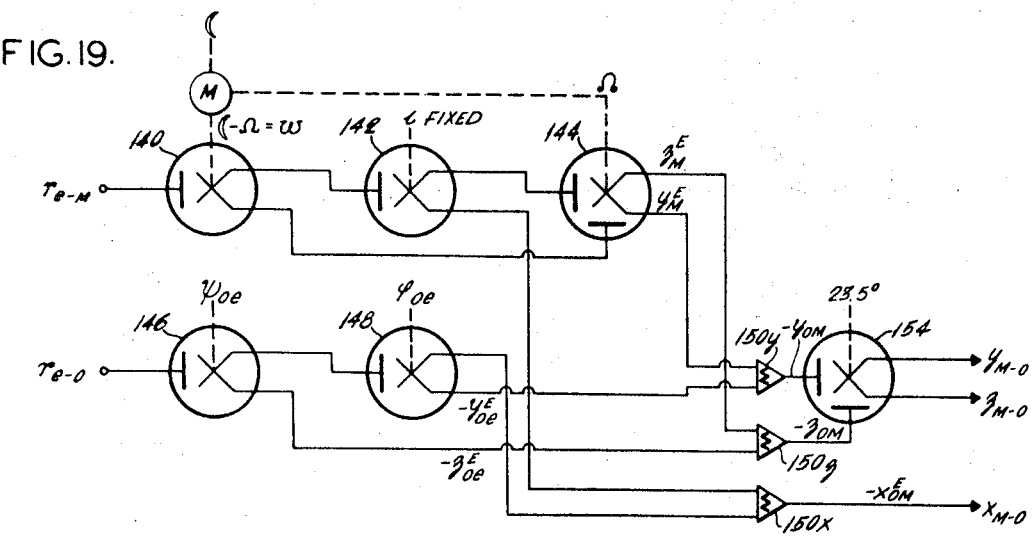
FIG. 19.
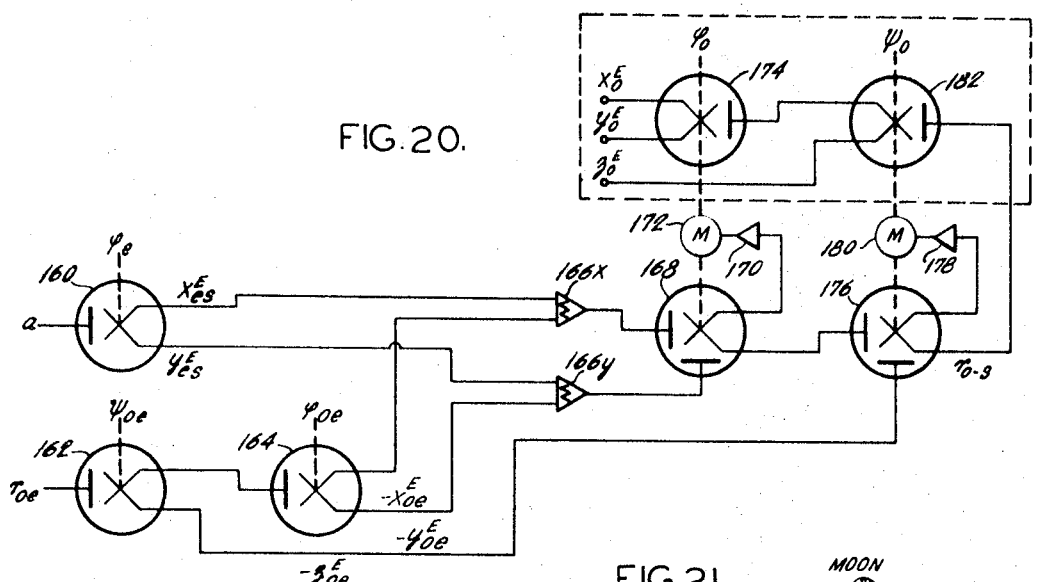
FIG. 20.
FIG. 22.
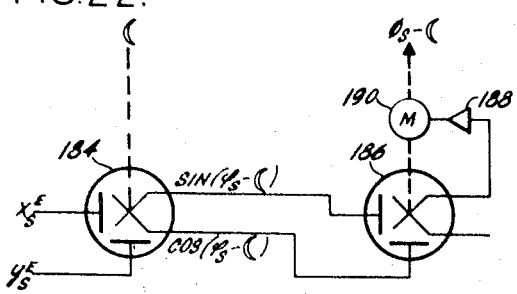
FIG. 21.
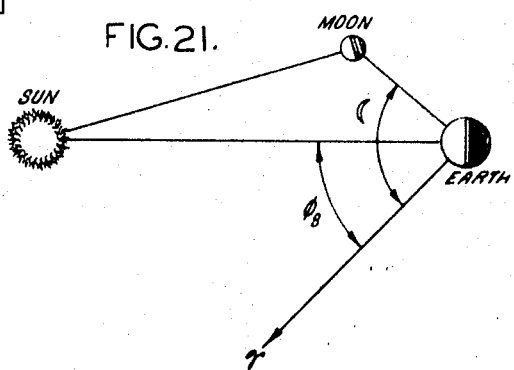
INVENTOR:
LEONARD SKOLNICK
BY Howson & Howson,
ATTYS.

Patented April 13, 1971
3,574,955
10 Sheets-Sheet 7
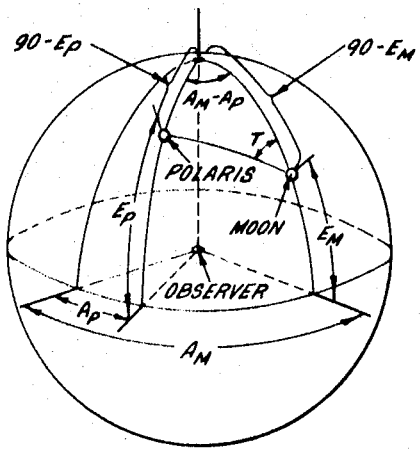
FIG.23.
FIG.24.
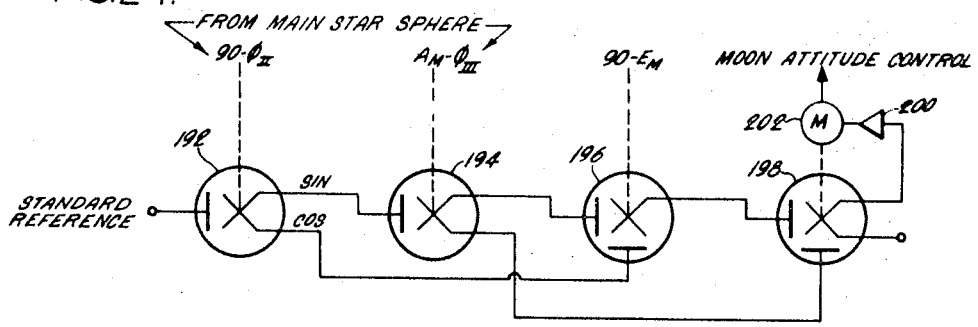
FIG.25.
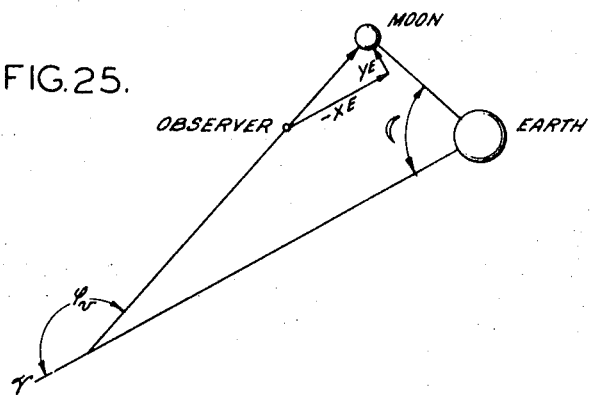
FIG.26.
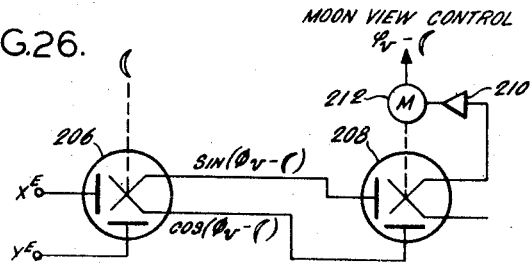
INVENTOR:
LEONARD SKOLNICK
BY Howson & Howson
ATTYS.

INVENTOR:
LEONARD SKOLNICK
BY Howson any Howson,
ATTYS.

PLANETARIUM USING A RECTANGULAR COORDINATE SYSTEM

This invention relates to planetariums and particularly to a novel computer control for a planetarium system which provides greater flexibility than prior art instruments. The system of the present invention provides greater flexibility in that it is capable of simulating observer position anywhere in the solar system and it is likewise capable of simulating to a higher degree than in the past the effects seen in cis-lunar space, the solar system regions close to the earth and moon. The computer system of the present invention was conceived as probably the simplest and a highly accurate means of control of the planetarium system.

In the U.S. Pat. of Wallace E. Frank, No. 3,256,619, a planetarium instrument is described in which the prior art limitations to clockwork coupling of planets to the star field projector is eliminated, as far as the planet simulation aspects of the equipment are concerned. The planet analogs of that system are capable of selective repositioning in any selected part of their orbit position. However, the analog elements simulating the planets are likewise limited to simulation of orbits as seen from earth or near earth space. Heretofore, in fact, planetarium systems in general have been earth-bound in that all of the effects generated by the planetarium instrument in the system are limited to those which would be observed from the earth or near the earth.

The planetarium invention described herein goes a major step further, permitting not only release from the time related limitations but also release from position in space related limitations to the extent that any position in solar system space may be simulated. In accordance with that invention any place within solar system space can be simulated.

The function of the planetarium invention is to define the positions of the sun and planets as seen from earth, from any planet, or from any general observer position within the general limits of the solar system. The system is, therefore, capable of all effects of prior art systems in defining the positions of the sun, moon and planets as seen from earth. It is also capable of defining the positions of the sun, moon and planets and earth as seen from other places within the solar system.

In accordance with the present invention, the operation of the planetarium invention is accomplished by employing coordinate conversion computers to change polar or spherical observational coordinates to rectangular coordinates. Means is used to take the difference between the corresponding rectangular coordinates to produce the components of line of sight vectors from a viewer position to a viewed point in celestial coordinates. (The input to these computers is information about the position of a line of sight vector.) This information is then converted to room coordinates by position computers to generate the signals necessary to position the projector which simulates the viewed point. The concept of use of line of sight computation in itself appears to be new and additionally the use of the radial distance for any purpose in a planetarium is believed to be new.

Such information can be generated in a variety of ways, but the preferred manner of doing so is by employing a reference frame such as one defined by a system having an origin at the center of the sun and axes extending respectively toward Polaris, the vernal equinox and a direction mutually perpendicular to these two. In accordance with my invention positions designated on the star sphere in terms of latitude and longitude or other means, some of which will be described herein, and radial distance from the sun as origin are then converted into terms of rectangular coordinates (e.g., $x$, $y$ and $z$) mutually perpendicular to one another, and preferably one in which Polaris supplies the $z$ axis and the vernal equinox the $x$. Obtaining line of sight vectors is a simple operation once the rectangular coordinates are obtained. The concept of taking general information about viewed point position, referencing it with star field projector coordinates in a planetarium room and generating an output to direct a projector is a new approach, however.

The planetarium system invention of Wallace E. Frank also makes possible the use of an earth-centered reference system when considering cis-lunar space. This reference frame, is, in turn, capable of coordination within the sun-centered reference system for other parts of the solar system through the earth simulation in that system. Cis-lunar space in this instance is defined to extend twice the moon's distance from earth. The relative positions of the earth, the moon and an observer at any selected location in cis-lunar space can be defined by techniques similar to the techniques used for planets and general observers in solar system space. The present invention additionally permits realistic simulation of the phases of the moon and of the earth from any observed position. It also permits correction of the view of the moon and of the earth in and near the orbital plane of the moon. It also permits correction of moon and earth attitude as an observer changes position in cis-lunar space.

Figure 4:
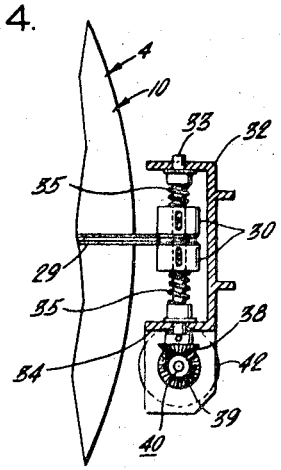
FIG. 4 is a perspective view of a tube element for use with the present invention.
Figure 5:
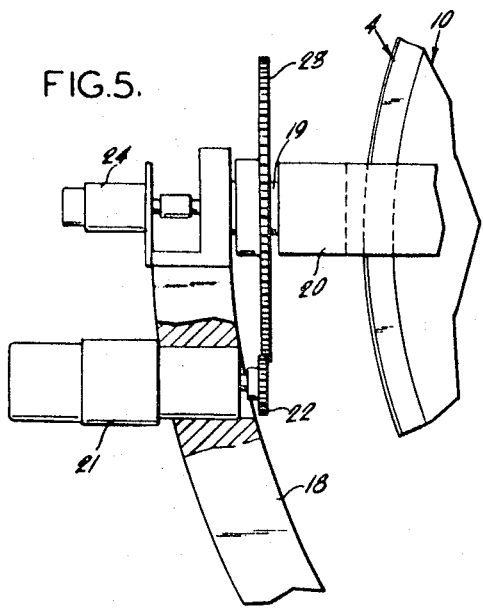
Figure 10:
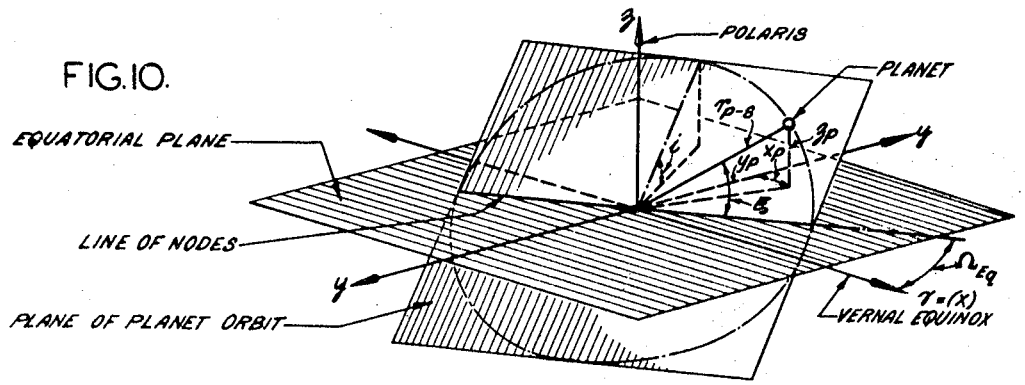
Figure 11:
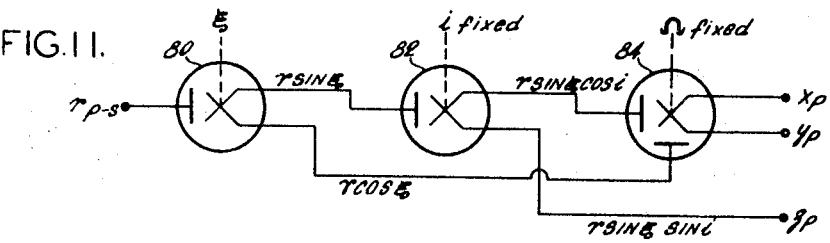
Figure 14:
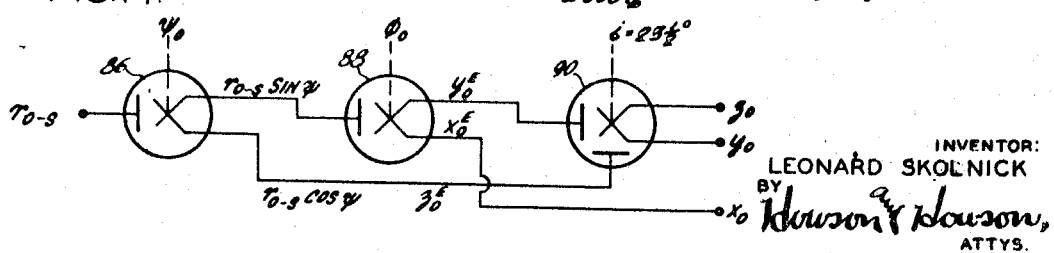
Figure 27:
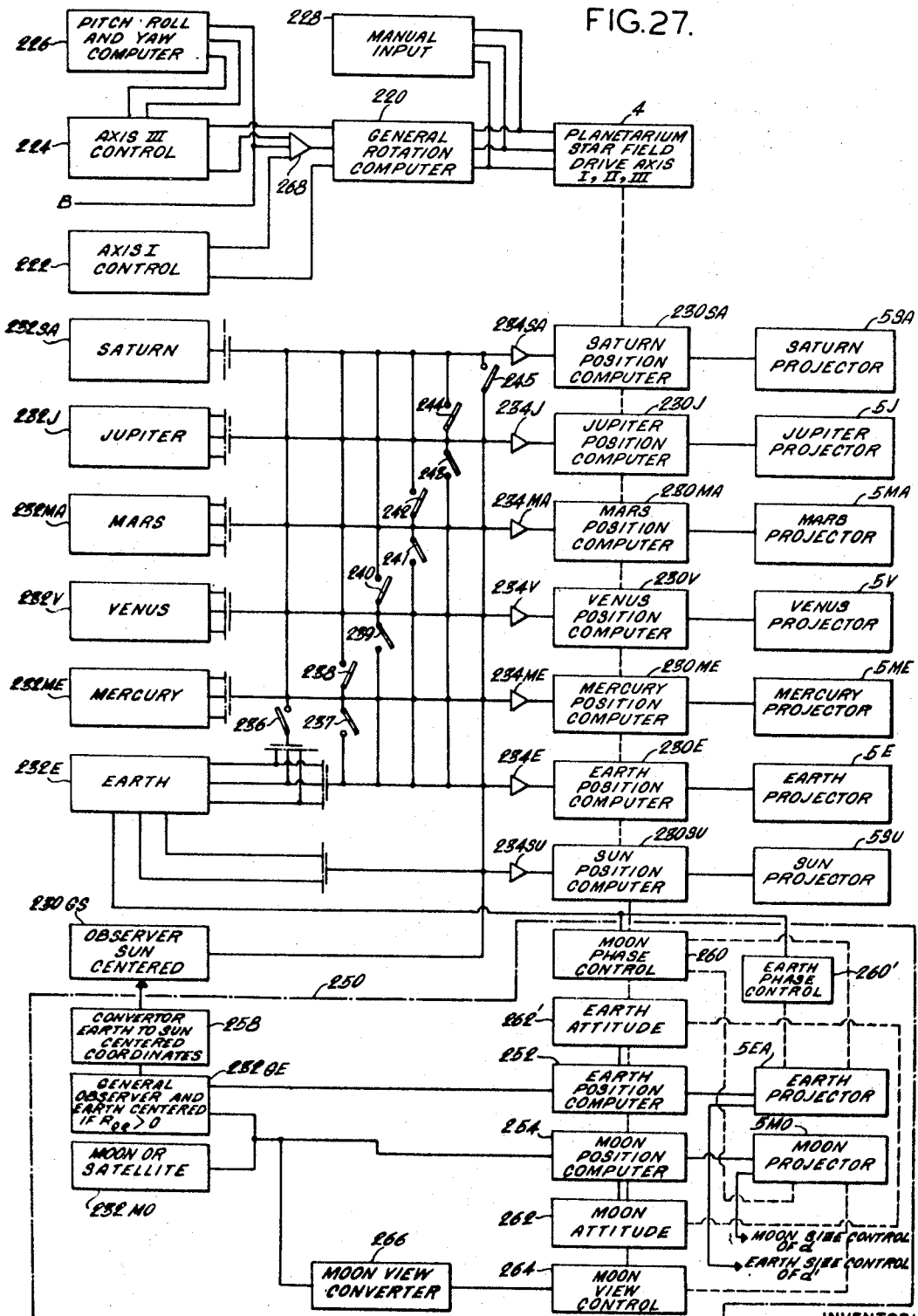
Figure 29:
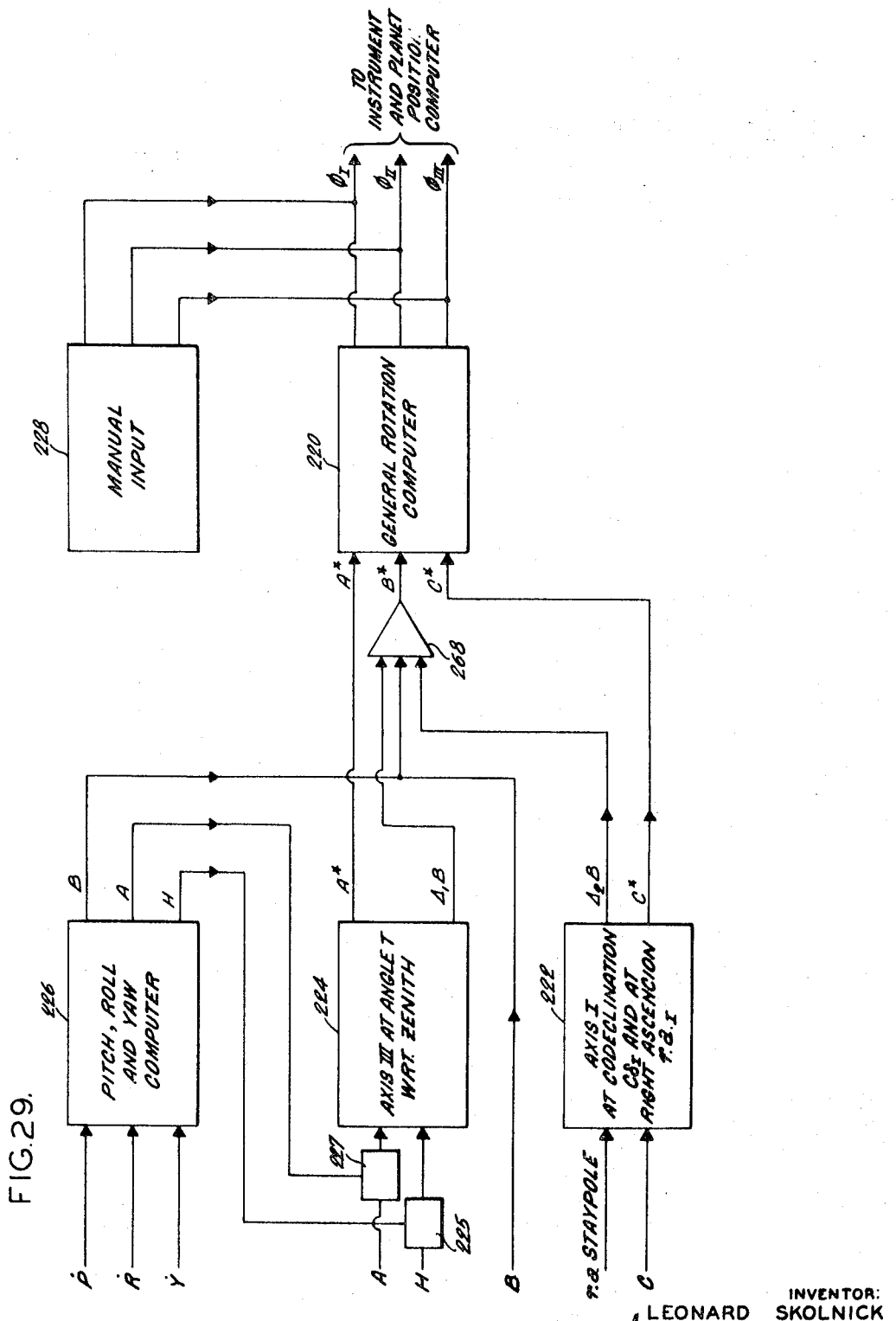
Figure 30:
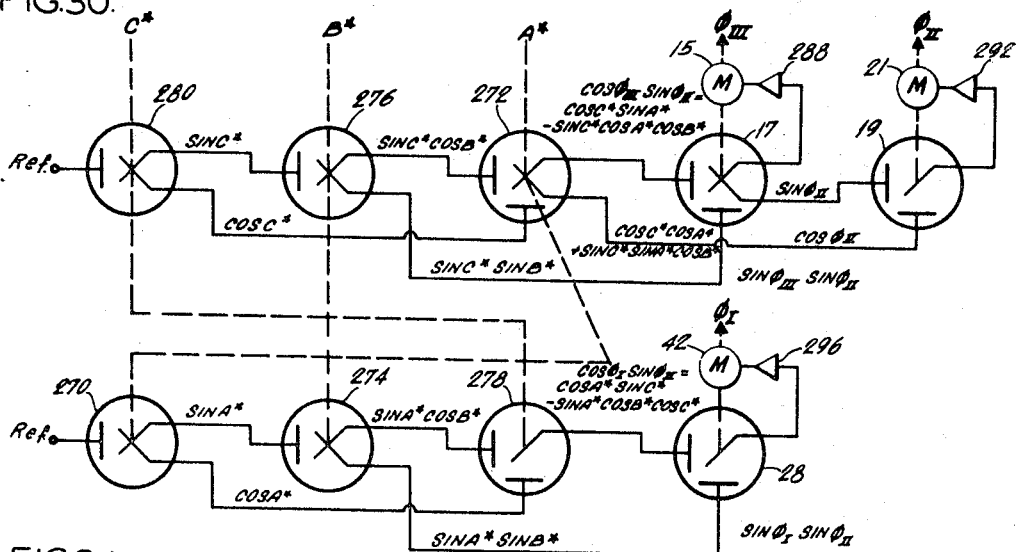
Figure 31:
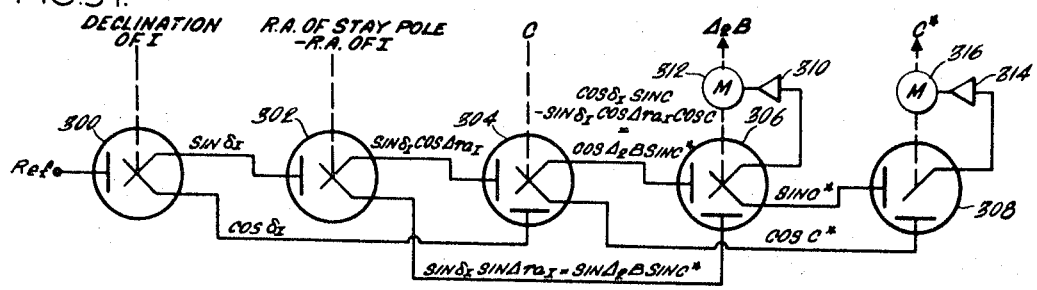
Figure 32:
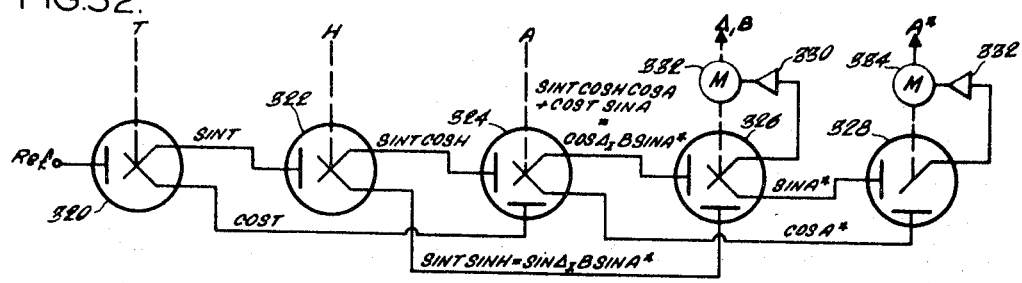
Figure 33:
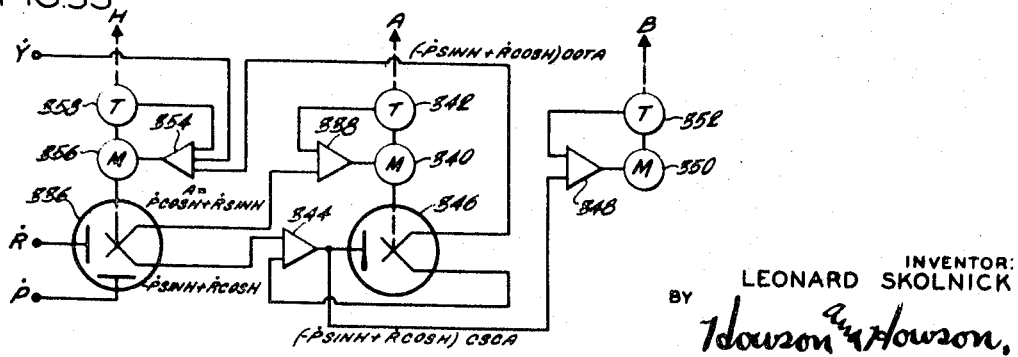

For a better understanding of the present invention, reference is made to the following drawings, in which:

FIG. 1 shows a schematic sectional view of the planetarium including the planetarium instrument, the domed auditorium and the console;

FIG. 2 is a side elevational view of the planetarium instrument including separate planet and star field projectors;

FIG. 3 is a sectional view taken along lines 3–3 in FIG. 2;

FIG. 4 is a sectional view taken along lines 4–4 in FIG. 3;

FIG. 5 is a sectional view taken along lines 5–5 in FIG. 2;

FIG. 6 is a view similar to part of FIG. 2 showing a modified celestial sphere projector;

FIG. 7 is a plan view from above along lines 7–7 in FIG. 2 of one of the planet projectors;

FIG. 8 is a side elevational view of the planet projector structure shown in FIG. 7, partially broken away and shown in section;

FIG. 9 is a diagrammatic representation correlating a preferred coordinate system employed to advantage in the practice of the present invention with the axes of the planetarium instrument;

FIG. 10 is a schematic diagram showing the orbit and position of a planet superimposed on the preferred rectangular coordinate system of the present invention;

FIG. 11 is a schematic circuit diagram of a coordinate conversion computer for planet position;

FIG. 12 is a schematic diagram similar to that of FIG. 10 but specific to the orbit and position of the earth;

FIG. 13 is a schematic circuit diagram of a coordinate conversion computer for earth position;

FIG. 14 is a coordinate conversion computer for generalized observer position in solar system space;

FIG. 15 is a schematical diagram of a system combining planet and earth coordinate conversion computers into line of sight computers in an earth mode of operation, wherein the planet, and the sun are observed as they would be from the surface of the earth, expressed in the celestial reference frame;

FIG. 16 is a schematic diagram of a system combining general observer with earth and planet coordinate conversion computers into line of sight computers in a general observer mode of operation, wherein the earth, another planet and the sun are observed as they would be from some selected position in solar system space;

FIG. 17 is a schematic diagram of a system for line of sight computers in a planetary mode of operation wherein the earth and another planet and the sun are observed as they would be from a third planet;

FIG. 18 is a schematic circuit diagram of a planet position computer;

FIG. 19 is a schematic circuit combining a general observer with a moon coordinate conversion computer into a line of sight computer wherein the moon is observed as it would be from a selected position in cis-lunar space;

FIG. 20 is a schematic circuit diagram of a coupling system for coupling components permitting an earth-centered view into a sun-centered coordinate conversion and line of sight computer system;

FIG. 21 is a schematic diagram of the earth, sun and moon showing the geometry of moon phasing;

FIG. 22 is a schematic circuit diagram of a system to compute moon phasing in the planetarium;

FIG. 23 is a schematic diagram illustrating one means of solving the problem involved in moon attitude control;

FIG. 24 is a schematic circuit diagram showing the computer system for moon attitude control;

FIG. 25 is a schematic diagram illustrating the geometry of moon view control;

FIG. 26 is a schematic circuit diagram of the moon view control computer;

FIG. 27 is a composite schematic diagram of one embodiment of a complete planetarium system in accordance with the present invention;

FIG. 28a is a schematic diagram representative of the spherical triangle which must be solved by computer to properly position the star field projector of FIG. 2;

FIG. 28b is a schematic diagram representative of the modified spherical triangle which must be solved by computer to properly position the star field projector of FIG. 6;

FIG. 29 is a block diagram showing computer components which may be employed with the planetarium of the present invention;

FIG. 30 is a schematic diagram of a general daily rotation computer for use with a star field projector;

FIG. 31 is a schematic diagram of a computer which compensates for a shift from a vertical to a nonvertical axis in a star field projector;

FIG. 32 is a schematic diagram of a computer which compensates for a shift in a polar axis of a star field projector from a position extending through Polaris; and FIG. 33 is a schematic diagram of a computer which superimposes a selected amount of pitch, roll and yaw movement upon the position or movement of a star field projector.

Referring first to FIG. 1, an installation in a planetarium similar to that disclosed in the U.S. Pat. of Wallace E. Frank No. 3,256,619, but differing in the instrument employed is shown. Typically, this installation will consist of the planetarium instrument 1 centered in the room, a hemispherical dome 2 positioned above the room with the instrument arranged approximately at its center. Suitable seating is preferably arranged within the room along a floor which is stepped as shown, but alternatively may be of conventional circular arrangement on a flat floor. A control console 3 is located somewhere in the room, preferably in the back in a situation where auditorium seating is employed. From this console, the planetarium show is set up and programmed and the mode of operation of the planetarium as well as special effects may be controlled. The console will include instrument controls, meters, input selection switches and other equipment, but much of the control equipment need not be in the console or the instrument but may be stored in a side room or elsewhere out of the way and connected to the console and instrument by suitable cable or other links in conventional manner.

As seen in FIG. 2 the star field projector 4 of the planetarium instrument 1 is preferably separate from the projectors 5 which project celestial bodies other than the stars, such as planets, the sun, the moon, the earth, and natural and artificial satellites of all types. The present invention by permitting separation of the planet and auxiliary projector from the star field projector makes it possible to greatly reduce the mass and possibly the volume of the star field projector so that its moment of inertia may be drastically reduced. The low inertia enables the use of auxiliary effects such as roll, pitch and way simulation. The separate projectors for each planet are also low inertia types and highly flexible in operation. Being separate these projectors require continual computer controlled coordination with the star field. The planet movements must be capable not only of being superimposed on the diurnal motion and other motions previously associated with the changing of a viewer position on the earth's surface but any motion simulating changes in viewer position and orientation in space. Separate projectors capable of universal positioning also permits planets, sun, moon and earth projections against any portion of the star field, not just the general area of the ecliptic, thus permitting simulation of view of their orbits from any possible vantage point. This added flexibility, is, therefore, important in simulating space ship flight, or the like, and simulation of effects of roll, pitch and yaw may make such simulated flights seem even more realistic.

Star Field Projector Construction

Referring in particular to the star field projector 4 of FIG. 2 and the associated FIGS. 3, 4 and 5, many differences between this projector and those of the prior art are readily apparent. In the same respects the present projector differs from the intermediate space travel planetarium of my copending application Ser. No. 356,093. Most apparent is the separation of the star field projector 4 from the planet projectors 5 so that the star field projector may be consolidated into a spherical unit or hollow spherical shell 10. The shell 10 contains a suitable light source associated with suitable horizon defining cutoff means and will be provided with conventional appropriate lenses and pinholes to simulate the brighter stars and galaxies in the celestial sphere. Only an approximate hemisphere will be projected onto the planetarium dome at any one time, however. In order to permit this star field projector to simulate the heavens as seen from any place on earth or any location in solar system space, the sphere 10 must have the capability of all possible rotational orientations about its own center relative to the planetarium dome 2 in the arrangement shown in FIG. 1. In order to accomplish such reorientation, the sphere is provided with at least three axes of rotation designated, respectively I, II, III. In a three axis system axis I is preferably a polar axis arranged to coincide with the polar axis of the earth for convenience in simulating earthbound effects such as diurnal rotation which takes place about its axis. Axis III is preferably a vertical axis about which sphere 10 is rotated in order to change the heading relative to the planetarium dome. Axis II is normal to axis I and III and in the preferred embodiment is used to simulate difference in declination. Axes I and III may, of course, be otherwise oriented.

As seen in FIG. 2, Axis III is provided by yoke structure II which rotates on bearings between its vertically oriented stem 12 and a suitable sturdy support base 13, which, in turn, may be fixed to the common pedestal 14 shared with the planet projectors 5. A motor 15 fixed to the base is used to drive shaft 12 rotationally relative to the base 13 about the generally vertical axis III as result of engagement of the respective gear 16 fixed to the motor shaft and stem 12. Similar gear connection couples a resolver 17, or similar position sensor, to shaft 12 to sense the angular position of shaft 12 about axis III relative to a predetermined reference. The arms 18 of the yoke 11 provide the bearings for trunnionlike projections from ring 20 which are aligned with and define axis II. A motor drive 21 is supported on one of the yoke arms 18, (see FIG. 5). A gear 22 on the shaft of motor 21 drives gear 23 on one of the trunnions 19 and, therefore, the ring 20, to which the trunnions are fixed, relative to yoke arms 18 about the horizontal axis II. As seen in FIG. 5 a resolver 24 is employed for sensing the rotational orientation of the star field projector about axis II as taught in my copending application Ser. No. 356,093. Resolver 24 is supported on yoke 18 with its shaft fixed to rotate with trunnion 19.

The sphere 10 is, in turn, rotatably supported on the ring member 20 in suitable bearing means by aligned, rodlike projections 27, which define axis I and one of which provides the shaft of resolver 28 fixed to the sphere 10. In the embodiment shown movement of the sphere 10 relative to ring 20 about axis I, preferably the axis of Polaris, is produced through the equitorial ring flange 29 on the sphere 10. As seen in FIGS. 3 and 4, flange 29 is engaged by a pair of rollers 30, beveled edges of which are urged against the beveled edge of the periphery of the ring flange 29 to provide a frictional contact such that, when one of the rollers 30 is rotationally driven, the flange 29 is frictionally moved by the rollers, thereby driving the sphere 10 about its axis I defined by projections 27. The rollers are supported within parallel flanges of a bracket 32 supported, in turn, by ring 20, as best seen in FIG. 3. The rollers are provided with aligned shafts 33 journaled in bearings in the parallel flanges 34 of the bracket 32 and are spring urged toward one another along their shafts by spring elements 35. Ring flange 29 is trapped between the rollers 30. One of the roller shafts 33 is terminated in a bevel gear 38 which, in turn, engages a bevel gear 39 on a shaft 40 journaled in a part of the same supporting bracket 32, to which bracket the motor 42 is also affixed. The shaft 40 is preferably the shaft of the motor 42 so that drive by the motor is transmitted through the bevel gear 40 to bevel gear 38 and hence roller 30 on shaft 33. Because of the spring urging into frictional contact with the ring flange 29, both rollers 30 travel at the same speed and thereby drive flange 29 and the sphere 10.

Because of certain problems resulting from gimbal-lock in order to give the star field projector greater flexibility, it may be provided with a fourth axis as seen in the structure of FIG. 6. This arrangement makes it possible for the polar axis to pass through zenith orientations without 180 shifts about one or more of the axes and without response problems which occur frequently in connection with a three axes arrangement.

Referring to FIG. 6, corresponding parts are given corresponding numbers with the addition thereto of primes. In this case, instead of vertical shaft 50 serving as the stem of the yoke 11, shaft 50 is instead affixed to an arcuate segment shaped supporting member 52, which, in turn, rotatably supports the stem 12 of the yoke 11 in a suitable bearing arrangement permitting rotation about the axis of stem 12 . A drive motor 54 supported by the base 13 through gears 55 drives shaft 50 thereby driving the segment member 52 to establish the heading of axis III defined by shaft 12 . Segment member 52 itself is driven rotationally relative to the base 13 about the axis of its vertically oriented shaft 50. A synchro or resolver type pick up 56 senses the position of shaft 50 and segment 52. Stem 12 may still be considered axis III titled by an angle T. The yoke 11 is driven by motor 15 through shaft 12 by means of gears 16 . Synchro or resolver 17 senses shaft position about axis III. Gear 17 is coaxially fixed to shaft 50. It will be observed that shaft 50 provides a new fourth axis and that relative rotation is possible about all four axes.

Except for the difference in form cited, it may be presumed that the star field projector 4 of FIGS. 2 through 5 and that of FIG. 6 are in all essential respects similar to one another and except for differences recited and obvious from the drawings the star field projector, its rotational abilities, and associated structure for producing and sensing relative rotations are similar to those described in my copending application Ser. No. 356,093.

Planet Projector Construction

Associated with the star field projector are a plurality of planet projectors which may be varied in number in accordance with the desired display. The term "planet projector" as used herein will be understood to include moon, sun, earth and natural and artificial satellite projectors To schematically represent one possible arrangement, a number of planet projectors are shown in FIG. 1 having differing heights so that they will not occlude one another and to minimize occultation of light from the star field projector and so that the star field projector will not occlude light from them. Various alternative arrangements can be used to this end with the planet projectors even widely separated and located at the edges of the room. If the star field projector is centered, then corrections for the offcenter positions of the planet projectors have to be made to obtain proper orbits of their respective planets. Such correction can be made in the signal fed to the motors of the planet projectors. The individual planet projectors are supported upon their trestles above the base 14. The base 14 may be of any suitable form or may be omitted. The trestles 60 may be of any suitable form. Associated with each of the planet projectors is a light source 61 which is provided to simulate the particular celestial objects being projected in terms of size, color, features and orientation. THe light source is preferably arranged to project its beam upwardly through the top of the trestle 60 to impinge a mirror 63. Mirror 63 preferably has a fixed angle relative to the beam, preferably on the order of 45 to the vertical, which reflects the light from a vertical into a horizontal beam path. The light beam, in turn, is reflected from the horizontal by a second mirror 65 which reflects the beam into the proper direction to impinge the planetarium dome 2 at a selected place.

A better understanding of the mirror system of the planet projectors may be had by reference to FIGS. 7 and 8. Referring particularly to FIGS. 7 and 8, it will be seen that the mirrors 63 and 65 mounted on a turntable 67 atop the trestle 60. The turntable has a vertically oriented axis and is provided with suitable bearings between the top of the trestle and the turntable. Rotation of the turntable relative to the trestle is accomplished by means of the motor 68 fixed to the trestle whose shaft drives turntable 67 which through gears 69 also drive synchro or resolver 70. Fixed to the turntable to rotate with it is bracket 72 supporting mirror 63 in its selected position, e.g. at approximately 45 to the vertical light beam. The turntable and related structure is preferably hollow so that the light beam from light source 62 may pass through it and impinge mirror 63 without occlusion. Mirror 65 is rotatably supported on the turntable bracket portion 74 by a shaft 75, generally aligned with the light beam, which is reflected from source 61 by mirror 73. Shaft 75 is journaled in the bracket 74 to rotate about the longitudinal axis of the shaft 75 and mirror 65 is attached fixedly to the end of shaft 75 preferably so that the plane of the mirror 65 makes a selected angle, here on the order of 45 , with the shaft. The angles are selected such that by the combination of rotation of turntable 67 and shaft 75 the mirror 65 is capable of projecting the light beam onto the zenith and every other point of the planetarium dome 2. If this condition is satisfied then by a combination of rotation of the turntable 67 and rotation of the shaft 75 the light beam can be directed sequentially to all successive selected points in the planet orbit on the planetarium dome 2. Movement of the shaft 75 in a rotational manner is sensed by resolver 77 driven by gears 78 which also connect motor 79 to shaft 75. Motor 79 and synchro 77 are also fixed to the bracket 74. With a three axis star field projector system it is preferable that the axis of the planet projector which is fixed in the room be parallel to axis III of the star field projector.

Since the star field remains essentially unchanged within the solar system or at least within the range of the planets visible with the naked eye, star field projectors which do not change star positions relative to one another are quite acceptable, provided, of course, the star field may be moved as a whole. However, the same thing is obviously not true of planets. In accordance with the present invention, the planets are simulated in the planetarium by projectors which may be mechanically simpler than prior art planet projectors but which are responsive to a novel system quite different from any system of the prior art. In accordance with this system, planets may be made to follow paths relative to the planetarium dome simulating what is seen by an earthbound observer or equally well may be made to follow entirely different paths on the dome simulating what is seen by an observer elsewhere in solar system space within the range of planets visible from earth with the naked eye. The advantage of planet projectors built as analogs of planet orbits as seen from earth is, therefore, lost except in the earth mode of operation. Consequently, planet projectors of the present invention are preferably of extremely simple construction with the criteria that they must be able to simulate the planet position anywhere in the planetarium dome with a movement which is smooth and of a speed commensurate with relative speeds of other movement of the overall planetarium system. The planet projectors, in short, must be capable of being driven by the associated computer to any required position to simulate both the instantaneous position and orbit of the planet. The projectors must, of course, be coordinated with the star field projector since the planet orbits are with reference to the star field. However, this reference may be programmed into the overall control computer.

Planetarium Reference Frame

In accordance with the present invention, it is necessary to select a universal frame of reference useful through out solar system space. Most conveniently such a frame of reference is sun-centered since the sun is the center of the solar system and the planets revolve about it. It is possible to select in any manner a system of reference axes for the star field, but, because our earthbound point of view will still occupy a large part of planetarium time, a most convenient reference system is obtained using the direction to polaris as the z axis. The direction to the vernal equinox is then at right angles to this axis and, therefore, provides a convenient x axis. The third or y axis may then be taken mutually perpendicular to these two. These axes are shown in FIG. 9 combined with the axes of the planetarium equipment. Moreover, with polaris and the vernal equinox selected as one pair of mutually perpendicular axes, the third axis will lie in the equatorial plane. In an earthbound mode of the planetarium, this reference frame rotates with respect to the room about the polar axis to simulate daily motion of the earth. Anywhere in solar system space simulated the reference coordinates are always identifiable and fixed relative to the star field. FIG. 9 also shows the ecliptic plane since it holds great significance in planetarium geometry.

The coordinate system developed in FIG. 9 is used in FIG. 10 to describe a planet's orbit. It will be observed in FIG. 10 that the orbit of each planet defines a plane which intersects the equatorial plane at an angle $\Omega$ with the vernal equinox, which angle is constant for a given planet. The angle $\iota$ between the planes is also constant. The position of the planet, does, of course, vary within its orbital plane. If the planet's orbit is noncircular, $r_{pls}$ representing its radius or distance from the sun may not be constant. The angular velocity $\omega$ equals $$\frac{d\xi}{dt}$$

of the planet may also be considered a variable with negligible error for purposes of this planetarium system. The angular position from some reference such as the intersection of the orbital plane with the equatorial plane then becomes the only variable measured at the sun origin. The variable may be generated in an analog fashion, for example, by use of a common variable speed motor geared to produce the proper relative periods representative of revolution about the sun of shafts and other associated analog devices representative of the planets, including earth. The angular shaft position of the respective analog means representing the planet then becomes the variable of the planet analog.

Position Computers

It will be seen from FIG. 10, that from coordinates which correspond to right ascension and declination in the star field with the radius $r_{pls}$ added, at a given point in its orbit the planet position may be expressed in rectangular coordinates of the planet $x_p$, $y_p$, and $z_p$, as shown in FIG. 10. Position location relative to the star field is therefore in combination with use of the radius to complete the spherical coordinates. In accordance with the present invention, using position in the star field and radius information, rectangular coordinates are generated by coordinate conversion computers.

Planet position in rectangular coordinates in the sun-centered reference frame of FIG. 10 is generated by the system of FIG. 11. In this system, three resolvers 80, 82 and 84 are employed. In this embodiment, the resolver 80 has a fixed signal input, which may be a signal relative to a standard and stored in a control computer for use at this input to represent the radius from the sun origin of a selected planet. The input also may be set at a fixed level relative to inputs for other planets to represent the constant average radius from the sun of a specific planet in the solar system. $r_{pls}$ may alternatively be made a function of $\xi$ and $\xi$ need not be a linear function of time. This signal input $r_{pls}$ to the resolver 80 induces a voltage in each of its mutually perpendicular coils mounted on and rotatable by its shaft. In resolver 80 shaft position is changed in response to the changes in angle $\xi$ which as seen in FIG. 10 varies as planet position varies in the course of its orbit around the sun. The outputs of the resolver 80 then, as shown, are $r \sin \xi$, which is fed to the input of resolver 82, and $r \cos \xi$, which is fed to one of two inputs of resolver 84 (dropping subscript of $r_{pls}$). The shaft of resolver 82 which carries mutually perpendicular coils is fixed in position to represent the constant angle $i$ between the plane of the orbit of the planet and the equatorial plane. As a result, the outputs of this resolver 82 are $r \sin \xi \cos i$, which is fed to the second input of resolver 84, and $r \sin \xi \sin i$, which, by trigonometric conversion is equal to the $z_p$ rectangular coordinate. The shaft of resolver 84 positions its mutually perpendicular coils to represent the angle $\Omega$, which as seen in FIG. 10 is the angle of offset in the equatorial plane of the intersection of the orbital plane of the planet from the vernal equinox. Resolver 84 generates output signals $r \sin \xi \cos i \sin \Omega$ and $r \sin \xi \cos i \cos \Omega$, which are respectively representative of the rectangular coordinates $x_p$, $z_p$. As previously mentioned, in setting up the angle $\xi$, the information normally available is $\xi+\Omega$. This is the information normally available from observational data and involves sufficiently small errors to be acceptable as an input in place of $\xi$ alone.

The diagram of FIG. 12 represents the orbit of the planet Earth, a special simple case of the diagram of FIG. 10. Specifically, in this case the angle $\Omega$ equals zero since, by definition, the vernal equinox is the line of intersection of the equatorial plane and the ecliptic plane, and by definition the ecliptic plane is the plane of the earth's orbit around the sun for our epoch. The distance of the earth from the sun $r_{els}$ is one astronomical unit and serves as the reference for relative distances of other planets from the sun, and $i$ in this case is fixed at 23½°.

The simplified coordinate conversion computer for the earth is shown in FIG. 13. Only two resolvers are necessary because of the elimination of $\Omega$. A steady input signal to resolver 80', representative of one astronomical unit and a shaft position representing $\xi$ produces outputs a $\sin \xi$ and a $\cos \xi$, the latter being the rectangular coordinate $x_e$. Resolver 82' receives an input representative of $i$=23½° and the output of resolver 82' represents a $\sin \xi \cos 23½°$ and a $\sin \xi \sin 23½°$ which respectively represents $y_e$ and $z_e$ rectangular coordinates of the earth. Ecliptic coordinates, with a sun origin with $x^E$ and $y^E$ axes in the ecliptic plane and the $z^E$ axis mutually perpendicular thereto, can even more easily be generated for the earth. The $y_e^E$ coordinate is equal to a $\sin \xi$ which, as will be observed, is the output of the resolver 80'. The $x_e^E$ coordinate remains a $\cos \xi$, and, of course, for earth $z_e^E$ is zero. Ecliptic coordinates for planets having orbits out of the ecliptic plane will, of course, have a $z^E$ coordinate which may be generated using the ecliptic plane instead of the equatorial plane as the reference.

A generalized observer position may be obtained by the observer coordinate conversion computer of FIG. 14. It should be borne in mind that in solar system space, astronomical measurement may be in either ecliptic coordinates or in equatorial coordinates. Assuming that $x$ the observer would reference his position in ecliptic coordinates and that observer latitude is $\psi_o$, observer longitude is $\Phi_o$, and observer distance from the sun is $r_{ols}$, then the input to resolver 86 is an input signal proportional to $r_{ols}$. The shaft position of resolver 86 is representative of observer latitude. Therefore, resolver 86 produces an output $r_{ols}$ sin $\psi$ which is fed as the input signal into resolver 86. Resolver 86 also produces an output $r_{ols}$cos $\psi$ which represents $z_o^E$. The shaft position of resolver 86 so that its outputs represent observer longitude $\Phi_o$ are $r_{ols}$sin $\psi$ sin $\Phi$ and $r_{ols}$ sin $\psi$ cos $\Phi$, respectively, representing $y_o^E$ and $x_o^E$. Coordinate representative signals $y_o^E$ and $z_o^E$ respectively are fed into resolver 90, whose shaft position is representative of the ecliptic angle of 23½°. The output signals of resolver 90 are equatorial rectangular coordinates equal to $z_o$ and $y_o$, the equatorial coordinates of the observer. The $x_o^E$ output of resolver 86 is also be definition $x_o$ without further modification.

Line of Sight Computers

FIGS. 15, 16 and 17 are schematics showing representative combinations of coordinate conversion computers of FIGS. 11, 13 and 14 into line of sight computers for computing the direction from a selected viewed point. Either or both of the viewing position and the viewed point may be changing position as is contemplated by the variable inputs in the coordinate conversion computers of FIGS. 11, 13 and 14. The examples of FIGS. 15, 16 and 17 are intended to be representative and in no way limiting as to possible combinations.

FIG. 15 shows one means of computing line of sight vectors from the earth to a representative planet. The information derived could be used to direct the projector for that planet through its successive orbital positions relative to the star field as viewed from earth. It will be understood that in a practical planetarium system each planet coordinate conversion computer may be tied into the earth coordinate conversion computer in the same way to provide a line of sight direction of the associated planet projector to simulate the view from earth. In this system, the planet coordinate conversion computer 92, which was illustrated in FIG. 11 and described in connection therewith, is combined with the earth coordinate conversion computer 94 which was described in FIG. 13 and described in connection therewith. More specifically, the respective coordinate output signals of each computer are combined. By selective connection of the output terminals from earth coordinate conversion computer, output signals $x_e$, $y_e$ and $z_e$ may be selected as either positive or negative signals. Negative signals $-x_e$, $-y_e$ and $-z_e$ are, respectively, equal to the sun coordinates $+x_s$, $+y_s$ and $+z_s$ defining a line of sight vector from earth to sun. The $x$ signals from planet coordinate conversion computer 92 and earth coordinate conversion computer 94 are summed in summing amplifier 98$x$. Corresponding $y$ and $z$ signal outputs are summed in summing amplifiers 98$y$ and 98$z$. Since outputs from computer 94 are negative, the summing amplifiers 98$x$, 98$y$ and 98$z$ produce difference output signals, which taken together define the line of sight direction from earth to the viewed point. These signals fed into an appropriate planet position computer produce appropriate heading signals to direct the planet projector, such as the ones shown in FIG. 2, 7 and 8. The negative earth coordinate signals from the earth coordinate conversion computer represent, without further change, sun coordinate signals in a sun-centered coordinate system wherein the sun is at the origin from which the planet position coordinates are measured. That is, since the distances are the same but the direction is opposite, the negative of the planet coordinates define the direction to the sun. These negative earth coordinates are, therefore, used to position the sun projector. Mean sun coordinate position can be generated in a similar way by coordinate conversion computer 94 using negative ecliptic coordinate outputs $-X_e^E$ and $-Y_e^E$, respectively. It will be appreciated that in this, as in any mode of operation, there are other planet coordinate conversion computers for each of the planets simulated. A single earth coordinate conversion computer used as viewer position is used with every planet coordinate conversion computer in exactly the same manner to define the vector direction from earth to that planet for each of them.

In the general observer mode, the earth becomes merely another planet. Thus, the general observer line of sight computer of FIG. 16 employs a separate observer coordinate conversion computer 94' corresponding to earth coordinate conversion computer 94 in FIG. 15. The numbers corresponding to those designating the corresponding parts in the earth viewer line of sight computer of FIG. 15 are given corresponding primed numbers in the general observer line of sight computer of FIG. 16, designating the similarity of the roles. The observer coordinate conversion computer 94' is analogous in its role to the earth coordinate conversion computer 94 of FIG. 15 and its negative output signals are selected for use in the same manner. The negative signals thus derived are components of the line of sight vector to the sun as viewed from the observer position. These signals are combined with signals representing corresponding components from the planet coordinate conversion computers at summing means 98$x'$, 98$y'$, and 98$z'$ is to derive the component signals representing the line of sight vector from observer position to the viewed point in terms of rectangular coordinates The earth coordinate conversion computer 92$_e$ is the same in type as those for any other planet and earth line of sight components are derived through summing means 102$x$, 102$y$ and 102$z$. The mean sun position coordinates are derived by selecting the negative output of the ecliptic coordinates generated at coordinate conversion computer 94'. In this instance, three ecliptic coordinate signals are required since observer position can theoretically be anywhere in space.

Planetary mode of operation is illustrated in FIG. 17 wherein the observer is selected to be on any planet other than earth and the planet and earth coordinate conversion computers 92'' and 92$_e'$ provide the same functions they assumed in the general observer mode of FIG. 16. Instead of a general observer, the observer's viewing position is another planet whose changing coordinates are generated by coordinate conversion computer 94''. Negative signals are selected in the same way from observer coordinate conversion computer 94'' and added in the same way by summing means 98$x''$, 98$y''$ and 98$z''$ and 102$y'$, 102$x'$ and 102$z'$, respectively.

Position Computers

Referring now to FIG. 18, a typical position computer system is schematically illustrated. These position computers can be used to direct the projector for projecting the image of the planets, earth, moon, sun or any natural or artificial satellite. It will be appreciated that this same computer can be used as a sun position computer, earth position computer and the like, its function being to take the different signals representing the rectangular coordinate components of the line of sight vector of the viewed point in each case in the celestial reference frame and by a suitable computation obtain line of sight azimuth and elevation signals in the room reference frame to be used to drive a suitable planet projector. In the system illustrated in FIG. 18 a general planet position is derived and the signals $x_p-x_o$ and $y_p-y_o$ (where the subscript $p$ refers to the planet and the subscript $o$ to the observer) are fed into resolver 110 whose shaft position is representative of the angular position $\Phi_I$ of the polar axis (axis I) of the planetarium instrument. The output of this resolver $y'$ and $x'$, the respective components of the line of sight along the normal to the horizontal axis (axis II) in an equatorial plane $y'$ and $z_p-z_o$, are fed into the second resolver 112, whose shaft position is representative of 90° $\Phi$II (the co-latitude of the planetarium instrument). The output of resolver 112 is respectively $y''$, $z''$ which are the components of the line of sight vector normal to and in the x axis direction along the planetarium horizon plane and along the zenith, respectively. The $y''$ signal and the $x''$ signal are fed into resolver 114, whose shaft position is the planetarium azimuth positioned by vertical axis III. The output of resolver 114 is, respectively, $x'''$ and $y'''$, components of the line of sight vector along the polar and horizontal axes of the planetarium instrument.

In the preferred embodiment where axis III is vertical, the outputs of the resolver 114 are both fed as inputs to resolver 116 whose shaft position fixes the planet's elevation. The outputs from resolver 116 include an output through a signal amplifier 118 to a motor 120 which drives the elevation position shaft in the event that elevation position is not correct. This signal continues and the motor continues to drive until no signal is received at the appropriate output of the resolver. The other output of resolver 116 is used as an input to a resolver 122, whose other input is the output $z''$ from resolver 112. One of the outputs of resolver 122, in turn, feeds a signal amplifier 124 which drives azimuth position motor 126, whose modified shaft position determines the coil positions in resolver 122. The signal will be generated through signal amplifier 124 until the motor is in correct position to null out any signal, at which point the correct azimuth will be achieved. In the event that axis III is not vertical the position of the planet will still be correctly fixed by the above computation provided the fixed planet projector axis is parallel to axis III, but in this case the outputs will not correspond to azimuth and elevation of the planet.

Cis-Lunar Mode

When operating near the earth or the moon, one must take into consideration some of the errors that otherwise can be neglected in sun-centered operation. Moreover, in operating close to the earth, it is most convenient for the sake of simplicity of computation to operate in an earth-centered mode rather than using some other cis-lunar center. This earth centered mode can, if necessary, be keyed into sun-centered operation of the rest of the planetary system.

The problems peculiar to the earth and moon generally occur within a radius from earth of about twice the distance from the earth to the moon. In this portion of solar system space in addition to the problems of positioning the moon and the earth in the planetarium, it is necessary that both bodies be properly phased, have the correct attitude in the celestial sphere and be viewed from the proper side and have proper size. The output voltage from the earth and moon position computers is proportional to the distance between the observer and the celestial object and can be used to control the size of the projected image on the dome. Each of the other problems is related and yet requires separate solution and separate computer means. Since in most cases the problems having to do with viewing the earth are analogous to those viewing the moon, a consideration of the disposition of the problem with respect to the moon can be transposed by those skilled in the art to the analogous problem of the earth. Accordingly the problems with the moon will be specifically considered and be understood to apply with equal force to the corresponding problem with regard to the earth.

As suggested above, moon position in the solar system when near the earth, must be considered for the sake of accuracy in representing relative moon and earth relationships. Therefore, representing relative moon and earth relationships. Therefore, an earth-centered coordinate frame is essential in considering moon position within cis-lunar space. In considering the problem in earth-centered instead of sun-centered coordinates, the diagram of FIG. 10 is analogous to one which might be drawn for the earth-centered coordinates. Since this is so, it will be apparent that the coordinate conversion computer for moon position in an earth-centered system shown in FIG. 19 is quite analogous to the computer of FIG. 11 for a planet in a sun-centered system. One difference which must be taken into consideration in the earth-centered system is that, instead of having the orbit maintain a fixed position with respect to the frame of reference, the ascending node of the moon tends to shift. That is, the angle $\Omega$ is variable since the longitude of moonrise or the ascending node of the moon's orbit is variable. Also, the moon data is normally obtained in terms of ecliptic plane reference rather than equatorial plane and, in order to take advantage conveniently of the tabulated data, the reference should be readily available in the ecliptic plane rather than the equatorial plane. In order to obtain a line of sight vector with accuracy, it is, therefore, necessary to obtain the observer's longitude and latitude expressed in ecliptic coordinates. This is done with respect to the earth rather than the sun for the reason mentioned above.

Referring to FIG. 19 the moon coordinate conversion computer and an observer coordinate conversion computer have been combined in a line of sight computer to generate coordinates of the line of sight vector whenever required. The moon coordinate conversion computer consists of the resolvers 140, 142, and 144 with inputs and outputs and appropriate coupling as shown. An input signal proportional to the radius from the center of the earth to the center of the moon is provided to resolver 140 whose shaft is angularly positioned to represent the moon's position angle which corresponds with $\xi$ in FIG. 10 but is here represented as a crescent ☾. Actually because tabulated data is normally not available in that form, the input usually is ☾$-\Omega$, which may be expressed as $\omega$. Since the longitude of the ascending node shifts, $\Omega$ is no longer fixed as with planets, but is a variable and mechanically suitable differential means must be provided to accept ☾ and $\Omega$ inputs in order to obtain an accurate ☾$-\Omega$ input at the shaft. The output $r_{e1m}$ sin (☾$-\Omega$) is fed to the resolver 142 as its input. The shaft position for resolver 142 is the angle $i$, about 5 ¼°, between the moon's orbital plane and ecliptic plane. The cos output of this resolver is $x_m^E$. The sine component $r_{e1m}$ sin $i$ sin (☾$-\Omega$) 142 provides one input to resolver 144. A second input to resolver 144 is the output a signal $r_{e1m}$ cos (☾$-\Omega$) of resolver 140. The shaft position of resolver 144 is representative of $\Omega$, the angle between the vernal equinox and the ascending node of the moon's orbit. Since $\Omega$, is variable in this instance, suitable means to generate the variable signal is provided to position the shaft. The output of resolver 144 at the sine output is $z_m^E$ and at the cos output is $y_m^E$. Since the outputs from the moon coordinate conversion computer are in terms of moon position as viewed from an earth centered system, in order to obtain observer line of sight direction, observer position must be known in the same system of coordinates. Moreover, rectangular coordinates must be obtained and this is done by means of resolvers 146 and 148. A signal proportional to the observer radius from the center of the earth $r_{e1o}$ is the sole signal input of resolver 146, whose shaft position is representative of observer latitude $\psi_{oe}$. The cosine output of resolver 146 is directly representative of the Z coordinate $z_{oe}^E$. The output $r_{eo}$ sin $\psi_{eo}$ of resolver 146 is fed as the sole input to resolver 148. The outputs of resolver 148 represent the rectangular coordinates $x_{oe}^E$, which like output $z_{oe}^E$ may be selected as negative signals by lead reversal. The coordinate signals are summed by summing amplifiers 150x, 150y and 150z to give output differences of the signals $x_m^E - x_{oe}^E$, $y_m^E - y_{oe}^E$ and $z_m^E - z_{oe}^E$ which represent respectively the moon vector coordinates in the ecliptic system as viewed from earth, $x_{om}^E$, $y_{om}^E$ and $z_{om}^E$. The shaft position of resolver 154 is representative of ecliptic angle $i=23½°$. Coordinates are transferred from the resulting ecliptic line of sight rectangular coordinate components to such coordinates with reference to the equatorial plane y and z by putting signals into resolver 154. Coordinate $x_{om}^E$ by definition is the same as coordinate $x_{om}$.

The moon coordinate computer and line of sight computer can be used with appropriate different inputs to the resolvers 140 and 144 to simulate any earth satellite. This can be done using the same computer of FIG. 19 supplied for the moon or by supplying additional computer components, if artificial earth satellites are sufficiently important in a given planetarium installation.

In many planetariums, it will not be necessary to provide coupling between the earth-centered observer reference frame and the sun-centered reference frame. In such event, it will be understood that the moon position computer corresponds exactly to the planet position computer of FIG. 17. However, coupling earth- and sun-centered systems together can be accomplished as shown in FIG. 20, should this be necessary or desirable.

FIG. 20 shows the means of transferring from the earth-centered observer frame to the sun-centered frame or tying the two reference frames together. Since the earth has no elevation, its azimuth with respect to the sun is all that is necessary to be fed in as a shaft position to resolver 160. Resolver 160 receives an input signal representing $a$, one astronomical unit (the distance between the earth and the sun). The output of resolver 160 is earth position in terms of ecliptic $x^E$ and $y^E$ coordinates. By contrast, general observer position in cis-lunar space requires more input information. Observer latitude $\psi oe$ fed into resolver 162 as a shaft position to effect a signal proportional to the radius between the earth and the observer. The $r_{oe} \sin \psi oe$ output of resolver 162 is fed into resolver 164 and the cosine coordinate directly represents the component $z_{oe}^E$. The shaft position of resolver 164 is representative of observer longitude $\Phi oe$ relative to the earth so that the outputs of resolver 164 are $x$ and $y$ coordinates of the observer in the earth-centered system, still in an ecliptic reference frame. The $x$ and $y$ observer coordinates relative to earth are selected to be negative and combined with the earth position coordinated relative to the sun at the summing amplifiers 166$x$ and 166$y$, respectively. The output signals $x_{es}^E - x_{eo}^E$ and $y_{es}^E - ay_{eo}^E$ are supplied to resolver 168 as input signals. The shaft of this resolver represents observer longitude in a sun-centered system and its sine output winding produces a signal which is amplified in signal amplifier 170 and fed to motor 172 which drives the shaft of resolver 168 until the signal generated by the resolver sine coil is nulled out. This shaft position then represents the proper position of the observer longitude in a sun-centered system. Since resolver 174 in an observer-sun computer has a common shaft with resolver 168 and motor 172, the shaft of resolver 174 also represents an observer longitude. The cosine output of resolver 168 is then fed to resolver 176 which also receives the cosine signal output of resolver 162 which represents $z_{oe}^E$. These two signals are combined by resolver 176 whose shaft position is representative of observer latitude $\psi_o$ relative to the sun. The sine component of the signal is used to connect the shaft position of resolver 176 which is representative of the observer's sun latitude. The sine signal output from the resolver 176 is fed to amplifier 178. If the shaft position of resolver 174 representing observer latitude $\psi_o$ is wrong, a signal is generated which drives motor 180 to reposition the shaft until no signal output is obtained, at which point the latitude represented by the shaft is proper. The same shaft position determines the position of the shaft of resolver 182 in the observer-sun system. The other output of resolver 176, the cos component, is a signal representative of the radial distance of the observer from the sun and can therefore be fed directly into the resolver 182 as its input signal. The sine output of resolver 182 provides an input for resolver 174 and the cosine signal provides an $x$ observer coordinate. The $y$ and $z$ observer coordinates, are, in turn, generated by the output of resolver 174, whose shaft position is determined by motor 174 and represents the longitude of the observer position in the sun system. This observer output is the same as the general observer output in FIG. 14.

The problem of moon phasing is diagrammed in FIG. 21. This becomes a plane geometry problem in the sense that the earth, the moon and the sun may be considered to be in an essentially common plane. Taking the vernal equinox as the reference direction from earth, the angle of the sun $\Phi_s$ relative to the vernal equinox as viewed from earth is one value of importance. The angle $\mathbb{C}$ representing the angle between the moon and the vernal equinox as viewed from earth, is another value of importance. $\Phi_s - \mathbb{C}$ is the information required to operate a moon phasing control of known type. This phasing control will be operated on the principle that when $\Phi_s - \mathbb{C}$ is equal to zero, the moon cannot be seen from earth, since only the moon's side away from earth is lit. When $\Phi_s - \mathbb{C}$ equals $\pi$ radians, the side of the moon toward earth is fully lit and the moon is full. Intermediate phasing of the moon can then be calibrated as different positions between these two output signals from the earth analog representing the coordinates $x_s^E$ and $y_s^E$ in the ecliptic system and in the plane of the ecliptic. As shown in FIG. 22 these signals are fed to the moon phasing resolver 184 which has its shaft positioned to represent angle $\mathbb{C}$ at resolver 184. Both sine and cosine component signal outputs of the resolver are fed as inputs into resolver 186. The shaft of resolver 186 is positioned to represent $\Phi_s - \mathbb{C}$. The sine output of resolver 186 is amplified by signal amplifier 188 and fed to motor 190 which drives the shaft until it reaches the position where no signal is generated and, therefore, is proper position to represent $\Phi_s - \mathbb{C}$. This shaft, in turn, is coupled to the phasing mechanism for the moon.

As previously mentioned, a similar phasing device can be provided for the earth. In the computation of the moon phasing, the component of the moon's orbit which does not lie in the ecliptic plane is neglected and makes no substantial difference in the effect.

The moon attitude control has to do with the heading of the pole of the moon with respect to the viewer. In actuality, the polar axis of the moon points approximately to the ecliptic pole. However, in the planetarium, it is a reasonable approximation, and greatly simplifies the problem, if the assumption is made that the moon's pole points instead toward Polaris. This enables the axis of the moon to point along its local meridian, i.e., the point passing through the zenith M or deviate therefrom by simple manipulation of the projector axis. FIG. 23 shows the geometry of the pole heading correction necessary in a moon attitude control. Herein $A_p$ and $E_p$ represent the azimuth and elevation of Polaris. $A_m$ and $E_m$ represent the azimuth and elevation of the moon after planet position computation has been completed. T represents the desired angle of the axis of the moon from the local meridian. By spherical trigonometry $$\operatorname{ctn} T = \frac{\sin(90-E_m)\cos(90-E_p) - \cos(90-E_m)\sin(90-E_p)\cos(A_m-A_p)}{\sin(90-E_p)\sin(A_m-A_p)}$$

Referring to FIG. 24, the moon attitude control computer is shown. This consists of resolver 192 into which a reference signal of standard size is fed. The shaft of resolver 192 is positioned from the main star sphere at 90°−$\Phi$II. The sine output of resolver 192 can then be fed into the resolver 194 whose shaft position as derived from the star field represents the azimuth of the moon less the orientation of axis III ($A_m - \Phi$ III). The sine output of resolver 194 together with the cosine output of resolver 192 provide input signals to resolver 196 whose shaft position is 90°$E_m$. The sine output of resolver 196 is fed as an input to resolver 198 as is the cosine output of resolver 194. These two input signals combine and together with shaft position, which represents moon attitude position, produce an output. The output at the sine coil is fed to a signal amplifier 200 and operates the motor 202 which drives the shaft of resolver 198 to the correct position to represent moon attitude, if not in that position. After the shaft reaches the position representing correct moon attitude, no further output will be produced. The shaft of resolver 198 is therefore used to position the moon attitude control apparatus.

The view of the moon, or the view of the earth, depends upon observer position in cis-lunar space. Conceivably the backside or part of the backside of the moon might be viewed as from the position shown in FIG. 25. Since at present there are limitations on the way the moon characteristics and earth characteristics can be displayed, it will be assumed that the view is confined to the elliptic plane. With this simplification, the diagram of FIG. 25 showing the relative position of the observer and the moon and the earth can be drawn. In this diagram, the angle between the vernal equinox and the earth-moon line is represented as $\mathbb{C}$. The obtuse angle at which the line between the moon and the observer intersects the vernal equinox line throughout the earth is identified as $\Phi v$ so that the angle between the observer's viewing position and the view of the moon as seen from earth becomes $\Phi_r - \mathbb{C}$. The means of obtaining the observer's position in terms of $x^E$ and $y^E$ (ecliptic coordinates) has been shown in FIG. 19 and these coordinates can be used as the input to the computer of FIG. 26 as they are derived from the computer of FIG. 19 assuming the observer in the ecliptic plane, i.e. $z^E$ equals zero. The resolver 206 these coordinates as input signals. With a shaft setting representing $\mathbb{C}$, the proper position for the moon view control. If no error exists in the first place, no repositioning of the shaft of resolver 208 will be necessary.

Integration of Planetarium Computers

FIG. 27 shows in a highly schematic block diagram the overall operation of the computer system controlling the planetarium. In this diagram, the main star field projector and the individual planet projectors are illustrated only as blocks. Its computers are similarly schematically represented as blocks and only the broadest aspect of the interconnections of the operational components are suggested by connecting lines which are not intended to accurately represent electrical connections. The star field projector 4 is controlled under ordinary circumstances by a general rotation computer 220, preferably of a type similar to that shown and described in my copending application Ser. No. 356,093, suitable for simulation of daily rotational motion of the star field about the pole of axis I or about any selected pole other than axis I. This computer, in short, makes it possible to simulate daily motion as viewed from the surface of another planet or vehicle or to simulate daily motion as viewed from the earth in another era in which the pole is shifted from Polaris.

In the event that axis I does not correspond to Polaris a correction is imposed on the general rotation computer by the axis I correction computer 222. In the event that axis III is not vertical, and specifically in the case where axis III is part of the four-axis system of FIG. 6, if the fourth axis is present still another computer 224 for correction of the position of the third axis is required. The computer hereinafter described is for the case in which axis III is in the reference meridian as defined. Of course, in a given system the third axis computer 224 may feed directly into the general rotation computer 220. In the event that it is desired to simulate pitch, roll and yaw, a further computer 226 is required to feed the general rotation computer, either directly or through the chain of correction computers as required. The pitch, roll and yaw computer simulates conditions which might be experienced in a spacecraft and the amounts of these effects can be selected, just as the parameters involved employed as inputs to the other computers may be selected.

In addition to the computer inputs just described, manual inputs 228 are provided to position the star field projector about the individual axes I, II and III and other axes, if employed, and to define the location of the staypole. These inputs may be automatically, as well as manually, adjusted in accordance with some predetermined program to simulate viewer reorientation anywhere in the solar system.

The planetarium star field projector 4 assumes positions in response to commands from the computer and manual inputs and, as required, supplies feedback information on the positions assumed. The planetarium star field projector also supplies information about the positions of its axis to the position computers as schematically indicated and as previously treated in some detail in connection with FIG. 18 for example. The planet position computer reference to the star field is thus sensed by each of the computers 230SA, 230J, 230MA, 230V, 230ME, 230E and 230SU.

These planet position computers, however, as previously described rely upon information from the coordinate conversion computers 232SA, 232J, 232MA, 232V, 232ME and 232E. As explained in some detail in connection with FIGS. 15, 16 and 17 vectorial sums are obtained through summing amplifiers 234SA, 234J, 234MA, 234V, 234ME, 234E and 234SU. The specific manner of connection of the planet analogs to obtain the vectorial sums requires a selection of mode of operation which is accomplished by appropriate switching, schematically represented by switches 236, 237, 238, 239, 240, 241, 242, 243, 244 and 245 which, it will be understood, are intended to represent the ability to switch from one mode or viewpoint to another. Typical modes of operation are represented in FIGS. 15, 16 and 17 for certain limited numbers of bodies, by way of example. With more computer components the switching becomes more complex but the principle remains the same. With this vectorial information and the star field orientation information, the planet position computers are able to, in turn, appropriately direct their projectors 5SA, 5J, 5MA, 5V, 5ME, 5E and 5SU to simulate appropriate selected positions of the respective planets and the sun on the planetarium dome. The positions of the planets will be understood to be changing with time in accordance with input information to the planet coordinate conversion computers which, of course, must be programmed with appropriate information relative to one another.

The cis-lunar system is shown within dot and dashed box 250 and provides its own earth projector 5EA and moon projector 5MO, which projectors may be equipped with slides showing detail of the projected body and with zoom lenses to simulate size of the body dependent upon distance between the viewer and the body. The system also includes the various computers shown in FIGS. 19, 20, 22, 24 and 26. Thus, the general observer coordinate conversion computer 232GE and the moon or satellite computer 232MO are fed to the earth position and the earth position computer 252 and the moon position computer 254, respectively, through the means provided to convert from ecliptic to equatorial coordinates as shown in FIG. 19. Information from the earth position computer 252 is, in turn, used to position the earth projector 5EA, and information from the moon position computer is, in turn, used to position the moon projector 5MO.

In order to convert the cis-lunar earth-centered system into a sun-centered system the converter 258 which corresponds to the computer of FIG. 20 is employed to act upon the general observer coordinate conversion computer 230GS. A moon phase control computer 260 similar to that shown in FIG. 22 receives input information from the earth coordinate conversion computer 232E and, in turn, provides an output for an adjustment for the phase control shutter of moon projector 5MO. The same or a similar control may be used to simulate earth phasing, shown here as separate earth phase control 260' which acts upon the phasing shutter of the earth projector 5EA. The moon attitude control 262 receives information from moon position computer 254 to compute moon attitude which is used to adjust a slide or otherwise affect the moon projector 5MO in appropriate manner. Similarly, the earth attitude computer 262' receives an input from the earth position computer 252 as well as the main star field or star sphere and its output is used to adjust a slide or otherwise simulate earth attitude in the earth projector 5EA. Finally, moon view control is accomplished by computer 264 from the coordinate conversion computer input by way of moon view computer 266. This, in turn, produces an output which adjusts the moon projector 5MO in accordance with appropriate moon view.

Star Field Projector

FIGS. 28a and 28b provide a pair of diagrams showing the spherical geometry employed in order to better understand the problem of positioning the star field projector, and in this case the star sphere 10. FIG. 28a shows the geometry in the situation where the star field projector of FIG. 2 is involved.

In FIG. 28a, arc A is the angle between the zenith, which in this case is coincident with axis III, and the staypole; arc C is the angle between axis I at Polaris and the staypole; and angle B is the angle between arcs A and C in the spherical triangle. Angle B changes constantly in the course of simulation of daily motion but arcs A and C remain the same. The angles $\Phi_I$, $\Phi_{II}$, $\Phi_{III}$ represent the angular settings of the respective axes I, II and III which are derived by computer solution of the spherical triangle, given inputs A, B and C. The heading H is the angle between a reference meridian and a great circle meridian through the staypole, and in this case, like $\Phi_{III}$, is adjusted by axis III.

FIG. 28b shows the modified geometry when a star sphere projector having a tilted axis III, like that of the projector of FIG. 6, is employed and/or a further modification of axis I location away from Polaris is employed. The angles $\Phi_I$, $\Phi_{II}$, and $\Phi_{III}$, still represent the angular settings of the respective axes I, II and III. The reference meridian is defined by the zenith and the tilted axis III. The heading H is the angle at the zenith between the reference meridian and the great circle connecting the zenith and the staypole. Heading is no longer established directly by movement of axis III, but is a computed output resulting from the action of the resolver chains on the headings input.

Arc A* is the angle between axis III tilted from the zenith M and the staypole and is computed from the heading and the tilt of axis III. Arc C* is the angle between the staypole and transposed axis I at the same location other than through Polaris. Angle B* is the angle between the arcs A* and C*. The changes in the locations of axes I and III or either of them accounts for the change in the triangle solved. If solution can be made of the triangle of FIG. 28a, shown in dot and dashed lines in FIG. 28b, then the general solution of any triangle having the vertices located by axes I and III as shown in the solid line triangle of FIG. 28b, can be obtained by superimposing conversion computers which effectively shift axis III from the zenith M to its selected tilted position and/or axis I from Polaris to any other selected position. Thus in a shift of axis III an input of A together with inputs representative of tilt T and heading H will produce an A* output together with an increment of correction $\Delta_1 B$ to correct from B to B*. Similarly in a shift of axis I, an input of C together with declination of axis I and the difference in the right ascensions of the staypole and axis I will produce C* output together with an increment of correction. $\Delta_2 B$ to correct B to B*. The correction of B to B* will required both corrections if both axes are shifted, or the appropriate one if only one axis is shifted. The axes once shifted will solve for the angles $\Phi_{II}$ and $\Phi_{III}$ of the solid line triangle in FIG. 28b. Of course $\Phi_{III}$ involves rotation about tilted axis III; $\Phi_I$ rotation about shifted axis I; and $\Phi_{II}$, rotation about axis II which is shifted with axis III and which is advantageously measured from shifted axis III.

Referring now to FIG. 29, the block diagram is intended to show in somewhat greater detail the way in which the parameters of FIG. 28a and FIG. 28b are used. Thus, it will be seen the general rotation computer 220 produces outputs to adjust the star field projector, star sphere 10, about axes I, II and III (and others which may be employed). This adjustment is coordinated with and relative to manual settings of the individual axes through the manual input 228. The inputs into the general rotation computer 220 are the parameters A*, B*, and C*. These, in turn, are derived from the axis I computer 222, axis computer 224 and pitch, roll and yaw computer 226. Any one of the computers 222, 224 and 226 may be omitted and, if all are omitted, the inputs to the general rotation computer are equal to A, B and C. In the event that axis I is not a Polaris staypole axis, inputs of the right ascension of the staypole and the arc C to the computer 222, which assumes that axis I is preset at a codeclination $C\delta_1$, and at a right ascension $ra_1$, produce outputs of C* and $\Delta_2 B$. C* is then fed directly to the general rotation computer and $\Delta_2 B$ will be then fed to the summing differential or amplifier 268 to correct the reading of B to B*. If only computer 222 were employed, the A* input would equal A. Assuming that the axis III is at an angle T with the zenith, the computer 224 is arranged to receive an input equal to A and one equal to H, the heading as defined in FIG. 28B. The output of computer 224 is then A* which is fed directly to general rotation computer 220 and $\Delta_1 B$ which is fed together with the IB signal to summing differential or amplifier 268. If there is a $\Delta_1 B$ signal from computer 222, it would also be fed to the summing differential or amplifier 268. Since the B, $\Delta_1 B$ and $\Delta_2 B$ outputs are normally shaft positions, a differential for summing them is the more obvious expedient, but it will be understood that using well-known elements it is possible to convert these mechanical to electrical signals to be summed in a suitable summing amplifier.

When pitch, roll and yaw are involved, the parameters A and B, as well as the heading H, are modified and obtained as outputs from the computer 226. If computer 224 is employed, the outputs A and H are fed to the input of computer 224 and, if a manual H input is included as well, the separate H inputs may be combined by suitable differential 225. Otherwise A may be fed directly to the general rotation computer. Either at the input to computer 224, as shown, if computer 224 is used or before general rotation computer 220 a suitable differential 227 may be used to combine the H signal from computer 226 with a manual A input. B as an output from computer 226 is a varying component of the B fed directly to summing differential or amplifier 268 and together with the other B inputs to that component. The variable voltage inputs of the pitch, roll and yaw computer are first derivatives with respect to time $\dot{P}$, $\dot{R}$ and $\dot{Y}$ representing the rates of each of pitch, roll and yaw with respect to time. These inputs are voltages each of which is selected from a separate voltage divider calibrated directly in terms of rates of pitch, roll or yaw. In the event computer 226 is used but there is no yaw input, a manual B input electrical signal may be substituted by suitable switching. Similarly switching may be provided to permit an electrical manual A input through computer 226. The elements shown as blocks in FIG. 29 are shown in FIGS. 30, 31, 32 and 33. FIG. 30 is the general rotation computer of 220. FIG. 31 is the computer 222 having to do with the modified position of axis I. FIG. 32 is the computer 224 having to do with a shifted axis III. FIG. 33 is pitch, roll and yaw computer 226.

FIG. 30 corresponds to the general rotation computer shown and described in U.S. Pat. No. 3,256,619 to Wallace E. Frank with modifications to make it more suitable with the illustrated embodiment of the present invention. The resolvers 270 and 272 have their shafts set to represent the angle A*. The resolvers 274 and 276 have their shafts set to represent the angle B*, and the resolvers 278 and 280 have their shafts set to represent C*. The resolvers, except for common shaft positioning, form two separate chains. The upper chain produces outputs representative of the angles $\Phi_{II}$ and $\Phi_{III}$ and the lower chain produces an output representative of the angle $\Phi_I$. With inputs A*, B* and C*, using a fixed reference input signal, the desired output angles necessary to position the star field projector are provided. As previously stated, if axis III is not tilted, then A* is equal to A and represents observer latitude. If axis I extends through Polaris, then C* represents the angle between the Polaris and the chosen staypole or what would normally be C. B* is equal to B only if axis III is not tilted and axis I extends through Polaris except in the unique case where both Polaris and the staypole are on the reference meridian. In the course of a planetarium lecture describing daily rotation of the star field, B* is varied to indicate the daily rotation of the star field about the selected pole star and the computer of FIG. 30 calculates and supplies the correct angular positioning for this operation at axis I, II and III. In the event that the axes I and III are respectively noncoincident with Polaris and the zenith, then A*, B* and C* are no longer the terms defined but are modified terms still necessary to calculate the required axial positioning of axis I, II and III.

A fixed reference voltage applied at resolver 28 produces sin C and cos C outputs, the former $_{III}$ fed to resolver 276 and the cos C output from resolver 280 are used as inputs to resolver 272 and, in turn, produce the trigonometric output functions shown on the drawing. The output of resolver 272 fed to resolver 17 is the equivalent of cos $\Phi_{III}$ sin $\Phi_{II}$ whereas the output of resolver 276 fed to resolver 17 is equivalent to sin $\Phi_{III}$ sin $\Phi_{II}$. Combining these two inputs to resolver 17 enables one output to servoamplifier 288 which is a function of angle $\Phi_{III}$ to drive the motor 15 until its shaft which is connected to the shaft of resolver 17 is representative of the angle $\Phi_{III}$ at which point there is no further output signal through amplifier 288. The other output from resolver 17 is representative of sin $\Phi_{II}$. This output is fed with the output of resolver 272 representative of cos $\Phi_{II}$ to resolver 19 to produce an output signal proportional to the angle $\Phi_{II}$ through the servoamplifier 292 to motor 21. Motor 21 drives the shaft of resolver 284 until no further output signal is provided at which point the shaft assumes a position representative of angle $\Phi_{II}$. One manner of actually coupling the drive motors 15 and 21 to their respective axes III and IV is shown in FIG. 2.

The same input reference as fed resolver 280 is fed to resolver 270 whose outputs are therefore sin A* and cos A*. Sin A* fed as an input to resolver 274 produces the output sin A* cos B* and this output together with the cos A* output of resolver 270 provides the inputs for resolver 278. One of the outputs of resolver 278 is then the equivalent of cos $\Phi_I$ sin $\Phi_{II}$ as shown on the drawings and this is fed as one input to resolver 28. The other input to resolver 28 is the output of resolver 274 which as seen in the drawings is equivalent to sin $\Phi_I$ sin $\Phi_{II}$. Therefore, an output proportional to the angle $\Phi_{II}$ may be taken from resolver 28 and amplified by servoamplifier 296 prior to being fed to motor 42. When no signal is present to drive the motor 42, the shaft of the resolver 28, which is coupled to the motor 42 through the star sphere 10 as seen in FIG. 3 is in the position representative of the angle $\Phi_I$. This shaft may also be used as the output to drive the axis I of the star field projector.

If the axis I is out of alignment with Polaris, computer 222 (see FIG. 29), represented by the resolver chain of FIG. 31, is required to make the necessary corrections in input to the general rotation computer. In this computer the same common reference voltage as used for the inputs to resolver 270 and 280 of FIG. 30 is used as the input to resolver 300. The shaft of resolver 300 is positioned to represent the declination of axis I. Outputs from resolver 300 are fed as inputs to resolvers 302 and 304, respectively, the sine output of resolver 300 being the sole voltage input to resolver 302. The shaft position to resolver 302 is an angle representative of the difference of the right ascensions of the staypole and of axis I. One of the outputs of resolver 302 together with the second output of resolver 300 is fed to resolver 304 whose shaft is positioned to present the arc C in FIG. 28b. The outputs of resolver 304 provide inputs, respectively, to resolvers 306 and 308. The other input to resolver 306 is the second output from resolver 302. One of the output signals obtained from the resolver 306 is fed through servoamplifier 310 to motor 312 to position the coupled shafts of that motor and the resolver 306 represent $\Delta_2 B$, and, when the shaft assumes that position, no further signal will be generated through amplifier 310 to drive the motor. The other output of resolver 306 is fed as a second input to resolver 308. One of the outputs of resolver 308 is applied through servoamplifier 314 to motor 316 to position the coupled shafts of the motor and resolver to represent the arc C*. When the shaft position represents C* no further output signal will be generated through the amplifier 314. As explained in connection with FIG. 29, the outputs of FIG. 31 are mechanically combined by a suitable differential mechanism or converted to electrical signals and combined by a summing amplifier prior to input to the general rotation computer.

The resolver chain of FIG. 32 is the computer 224 of FIG. 29 and compensates for a tilt of axis III such as occurs in the structure of FIG. 6. Resolver 320 is supplied the same standard reference voltage input supplied to other resolver chains and has its shaft set at the tilt angle represented by the angle between the vertical at the instrument and axis III. The outputs of this resolver are fed respectively to resolvers 322 and 324. Resolver 322 has its shaft positioned to represent the heading H which is the angle to some selected reference meridian made by the plane defined by the vertical and axis III (see FIG. 6). One output of resolver 322 supplies a second input to resolver 324 and the other output supplies a second input to resolver 326. Resolver 324 has its shaft positioned to represent arc A. The outputs of resolver 324 are fed, respectively, as a second input to resolver 326 and as an input to resolver 328. One of the outputs of resolver 326 is fed through servoamplifier 330 to motor 332 whose shaft is coupled to the shaft of resolver 326. When the motor 332 no longer rotates because no signal through amplifier 330 drives it, its shaft position and that of resolver 326 is representative of the correction differential $\Delta_1 B$. The other output of resolver 326 is fed as a second input to resolver 328. One of the outputs of resolver 328 is amplified by servoamplifier 332 to drive motor 334. The shaft of motor 334 is coupled to the shaft of resolver 328 and when the signal driving the motor becomes zero, the shaft position of motor 334 and resolver 328 represents the output arc A*. The outputs $\Delta_1 B$ may be converted to an electrical signal as described above and fed to summing amplifier 268 where output B* together with the A* output are fed to the general rotation computer as shown in FIG. 29.

In the event that pitch, roll and yaw are to be simulated, the computer 226 of FIG. 29 is employed and composed of the components shown in FIG. 33. Specifically it consists of resolver 336 (see FIG. 6) having signal inputs proportional to the time rate of change of roll and the time rate of change of pitch respectively. The shaft of resolver 336 is positioned to represent the heading H of the observer. One of the outputs produced by resolver 336 is $\dot{A}$, the time rate of change of angle A, which is one of the input signals to servoamplifier 338. Servoamplifier 338 produces an output which drives motor 340 and the speed of the drive of the output of that motor is measured by tachometer generator 342 on its shaft. The output signal from tachometer 342 is fed back to servoamplifier 338 as a second input so that signal $\dot{A}$ balances or tends to balance the tachometer output and, when balanced, the shaft position of motor 340, represents angle A. The second output of resolver 336 is supplied to an operational amplifier 344 whose output feeds resolver 346. The other input of operational amplifier 344 is one of the outputs of resolver 346 which is fed back as an input to operational amplifier 344. With the feedback to the amplifier 344 from resolver 346, the output of the operational amplifier is designed to be equal to its input times the cosecant of the angle A (cosec A). This output is representative of $\dot{B}$, the rate of change of angle B. This $\dot{B}$ signal is used as an input to servoamplifier 348 which drives motor 350 whose speed is measured by tachometer generator 352. The tachometer generator's output is fed back as a second input to servoamplifier 348 in opposition to B signal from operational amplifier 344 and, when the signals balance so that there is no output from the amplifier 348, the shaft position of motor 350 is representative of the angle B. The second output of the resolver 346 is proportional to $\dot{H}$, the time rate of change derivative of heading H. This output is fed as an input to servoamplifier 354 which drives the motor 356 whose shaft is coupled to the shaft of resolver 336 and, therefore, is representative of the heading H. Also on the shaft of motor 356 is a tachometer generator 358 whose voltage output measurement of the speed of the motor 356 is fed back as a signal representative of the first derivative of H in opposition to the corresponding signal from the output of resolver 346. A third input to the amplifier 354 is $\dot{Y}$ the time rate of change of yaw Y, which accounts for a continuous change of yaw Y, which accounts for a continuous change of the heading. The A and H outputs of this resolver chain are used as inputs to computer 224 and output B may be converted to an electrical signal and fed to summing amplifier 268 as discussed above in connection with FIG. 29.

It will be apparent to those skilled in the art that the computers shown and described are merely by way of example and that equivalents may be substituted therefor. It will also be clear that components illustrated may be modified and that computers as a whole may take many different forms in accordance with the present invention. As previously explained, computers of the same or equivalent types may be added or deleted from the overall computer control within the scope of the invention. Modifications may also be made in the structural elements employed requiring changes in computer operation within the scope of the invention. All such changes within the scope of the claims are within the scope of the spirit of the present invention.

I claim:

1. In a planetarium system, a line of sight computer for computing the components of the line of sight vector between a viewer position and a viewed position within a star field reference having a common star field reference center comprising viewer position and viewed position coordinate input means for producing input signals representative of said positions in the star field reference and the radius distance from the common star field reference center, viewer position and viewed position coordinate conversion means for converting each of the input signals to signals at coordinate component output terminals representative of predetermined coordinates of each of said positions which are capable of accumulation and means receiving input from said coordinate conversion output terminals for producing corresponding rectangular coordinate components of said line of sight vector at separate output terminals for each coordinate by subtracting signals of corresponding coordinates one from the other to produce difference signals.

2. The line of sight computer of claim 1 in which at least one of the coordinate conversion means has reference to either the viewed position or the viewer position from an object moving in a closed repetitive orbit in a fixed plane about the origin of the coordinate system and in which said at least one coordinate conversion means is a computer having an input signal proportional to the radial distance of the object it represents from the center of the coordinate system and at least a variable angle input representing the angular position at said origin of said object from the line of intersection between the reference plane and the orbital plane.

3. The line of sight computer of claim 2 in which said at least one coordinate conversion means also has an input which simulates the angle between the plane of orbit and the fixed reference plane.

4. The line of sight computer of claim 2 in which the origin of the reference frame is the sun, the object is a planetlike body whose orbit intersects the equatorial plane at a fixed angle, which fixed input is applied as a further input to the computer.

5. The line of sight computer of claim 2 in which the origin of the reference frame is the center of the earth and in which the angle of the line of intersection of the orbital plane and the reference plane with the vernal equinox is variable and provides a variable input to the object coordinate conversion means in order to simulate moon position relative to the earth.

6. The line of sight computer of claim 1 in which at least one of the coordinate conversion means is responsive to a signal input which is representative of radius distance from a common star field reference center and other inputs include the longitude and latitude of that position.

7. In a planetarium system, a line of sight computer for computing the rectangular components of the line of sight vector between a viewer position and a viewed position within solar system space having a star field reference having a common star field reference center comprising viewer position and viewed position coordinate input means for producing input signals representative of positions in the star field reference and the radius distance from a common star field reference center, viewer position and viewed position coordinate conversion means for converting each of the input signals to signals at rectangular coordinate component output terminals representative of predetermined coordinates of each of said positions which are capable of accumulation and means receiving input from said coordinate conversion output terminals for producing corresponding rectangular coordinate components of said line of sight vector at separate output terminals for each coordinate by subtracting signals of corresponding coordinates one from the other to produce difference signals.

8. The line of sight computer of claim 2 in which the reference frame consists of a system having mutually perpendicular axes through the north celestial pole and the vernal equinox and a third axis mutually perpendicular to said axes, the vernal equinox and third axes defining an equatorial reference plane, from which the reference angle from the vernal equinox to the line of intersection between the orbital plane and the reference plane is taken and provided as an input to the viewed point coordinate conversion means.

9. The line of sight computer of claim 8 in which the origin of the reference frame is the sun, either the viewed position or the viewer position is from a planetlike body whose orbit intersects the equatorial plane at a fixed angle, which fixed angle is applied as a further input to the computer.

10. The line of sight computer of claim 8 in which the origin of the reference frame is the center of the earth and in which the angle of the line of intersection of the orbital plane and the reference plane with the vernal equinox is variable and provides a variable input to the object coordinate conversion means in order to simulate moon position relative to the earth.

11. The line of sight computer of claim 7 in which the viewer position varies in some predetermined manner with time and in which the means for obtaining each rectangular coordinate component of the line of sight vector is constantly computing the instantaneous line of sight rectangular components.

12. In a planetarium system, a position computer for a viewed position whose position in the star field is known in terms of star field components comprising means to generate rectangular coordinates of the viewed position in the star field in order to generate separate signals representative of line of sight component rectangular coordinates, coordinate conversion means to convert said coordinates to planetarium coordinates, said conversion means having inputs representative of the respective rectangular coordinates from the means to generate coordinates and additional inputs representative of position of the respective planetarium axes, and viewed position projection means including motor means independent of the star field projection means except for the motor means, said motor means being coupled to the coordinate conversion means to position the projection means such that the viewed position projected by it will fall in the proper position in the star field.

13. A phasing control for a planetarium moon or earth projector comprising means to generate a signal representative of earth position relative to the sun, signal generating means producing an output representative of moon position relative to the earth and sun in terms of a pair of signals representative of rectangular coordinates of the moon in the ecliptic plane with the center of the sun as origin, computer means receiving said signals as input information from the aforesaid means and also receiving an input representative of moon angle to the vernal equinox from the earth and producing an output signal representing phasing, and means cooperative with the moon or earth projector for simulating phasing coupled to the computer means and responsive to the output signal therefrom to position the simulating means.

14. A view control for planetarium moon or earth projector comprising signal generating means to generate an output representative of earth position relative to an observer in cis-lunar space in terms of a pair of signals representative of the rectangular coordinates of the earth with respect to the sun as origin, means to generate an output representative of moon position relative to the earth and cis-lunar space, computer means receiving said outputs from the aforesaid means as inputs together with an input representative of moon angle to the vernal equinox from the earth and producing therefrom an output signal representative of moon or earth view from observer positions, and means cooperative with the moon projector for simulating moon view coupled to the computer means and responsive to the output signal therefrom to position the moon view simulating means.

15. An attitude control for a planetarium moon or earth projector comprising means to generate a signal representative of moon position in the planetarium, means to generate a signal representative of the position of the north celestial pole in the planetarium, computer means receiving said signals as input information from the aforesaid means and producing therefrom an output signal representative of moon or earth attitude, and means cooperative with the moon or earth projector for simulating attitude coupled to the computer means and responsive to the output signals therefrom to position the attitude simulating means.

16. The attitude control of claim 15 in which the computer means receiving and operating upon said signals produces an output signal representative of moon attitude in accordance with the following formula:

$$\operatorname{ctn} T = \frac{\sin(90-E_m)\cos(90-E_p) - \cos(90-E_m)\sin(90-E_p)\cos(A_m-A_p)}{\sin(90-E_p)\sin(A_m-A_p)}$$

(where $A_p$ and $E_p$ are azimuth and elevation of polaris $A_m$ and $E_m$ are azimuth and elevation of the moon derived from planetarium computation and T is the desired tilt angle of the axis of the moon from its local meridian.

17. The attitude control of claim 16 in which the means to position the moon or earth axis tilt position includes servomotor means in a null feedback loop to correct moon or earth phasing automatically as relative positions of the moon or earth and observer change.

18. A phasing control for a planetarium moon or earth projector comprising means to generate a signal representative of earth position relative to the sun, signal generating means producing an output representative of moon position relative to the earth and sun, computer means receiving said signals as input information from the aforesaid means and producing therefrom an output signal representative of moon or earth phasing, and means cooperative with the moon or earth projector for simulating phasing coupled to the computer means and responsive to the output signal therefrom to position the phasing simulating means.

UNITED STATES PATENT OFFICE
CERTIFICATE OF CORRECTION

Patent No. 3,574,955           Dated April 13, 1971

Inventor(s)  Leonard Skolnick

It is certified that error appears in the above-identified patent and that said Letters Patent are hereby corrected as shown below:

Column 1,   line 3,    after "The" insert --planetarium--.
"      3,   " 69,      change "way" to --yaw--.
"      4,   " 43,      change "difference" to --differences--
"      5,   lines 34, 36 and 46,  change "11" to --11'--;
            "    36, 37, 40, 45 and 47, change "12" to --
            "    38 and 41,              change "13" to --
            line 46, change "15" to --15'--;
            "    47, change "16" to --16'--;
            "    47, change "17" to --17'--;
            "    48, change "17" to --17'--;
            "    51, change "difference" to --differences--
Column 6,   "    10, change "THe" to --The--;
            lines 13, 31 and 41, after "45" insert --degree
            line 23,  after "65" insert --are--;
            "    33,  change "62" to --61--.
Column 7,   lines 46 and 68, change "$r_{pls}$" to --$r_{p-s}$--.
Column 8,   lines 10, 12, 21, change "$r_{pls}$" to --$r_{p-s}$--;
            line 45, change "$r_{els}$" to --$r_{e-s}$--.
Column 9,   lines 1, 2, 4, 6, 8 (both occurrences) and 16, cha
            "$r_{ols}$" to --$r_{o-s}$--;
            line 16, change "be" to --by--.
Column 10,  line 24, cancel "is".
Column 12,  lines 31, 35 and 37, change "$r_{elm}$" to --$r_{e-m}$--
            line 51, change "$r_{elo_E}$" to --$r_{e-o_E}$--.
Column 13,  line 32, change "$ay_{eo}^E$" to --$y_{eo}^E$--.

FORM PO-1050 (10-69)

UNITED STATES PATENT OFFICE
CERTIFICATE OF CORRECTION

Patent No. 3,574,955  Dated April 13, 1971

Inventor(s) Leonard Skolnick  PAGE - 2

It is certified that error appears in the above-identified patent and that said Letters Patent are hereby corrected as shown below:

Column 14, line 44, after "T" insert -- = --;
 line 45, correct expression to read
$$\frac{\sin(90-E_m)\cos(90-E_p)-\cos(90-E_m)\sin(90-E_p)\cos(A_m-A_p)}{\sin(90-E_p)\sin(A_m-A_p)}$$

Column 15, line 7, change "$\phi_r - \mathbb{C}$" to --$\phi_v - \mathbb{C}$--;
 line 13, after "206 insert --employs--;
 line 14, after "the" first occurrence insert --output or resolver 206 is equal to sin $\phi_v - \mathbb{C}$ and cos $\phi_v - \mathbb{C}$. These two signals are then used as the input of resolver 208 whose shaft position represents the angle $\phi_v - \mathbb{C}$. Any signal at the sine output of resolver 208 is fed to signal amplifier 210 which, in turn, feeds its signal to drive motor 212. Motor 212, in turn, positions the shaft of resolver 208, if necessary. When the sine signal output of resolver 208 is eliminated, the shaft position remains fixed at what has thus been calculated to be $\phi_v - \mathbb{C}$, the--.

Column 17, line 24, change "headings" to --heading--;
 line 47, change "required" to --require--.

Column 18, line 6, change "$1_B$" to --B--;
 line 74, change "28" to --280--;
 line 75, change "$1_{11}$" to --being--.

UNITED STATES PATENT OFFICE
CERTIFICATE OF CORRECTION

Patent No. 3,574,955                              Dated April 13, 1971

Inventor(s)    Leonard Skolnick            PAGE - 3

It is certified that error appears in the above-identified patent and that said Letters Patent are hereby corrected as shown below:

Claim 1, line 10, after "signals" second occurrence, insert --having a star field reference and radius distance inputs, including a signal from the coordinate input means,--.

Claim 14, line 7, change "and" to --in--.

Claim 16, line 5, After "T" insert -- = --;
         line 6, correct the expression to read:

$$\frac{\sin(90-E_m)\cos(90-E_p) - \cos(90-E_m)\sin(90-E_p)\cos(A_m-A_p)}{\sin(90-E_p)\sin(A_m-A_p)}$$

Signed and sealed this 4th day of July 1972.

(SEAL)
Attest:

EDWARD M. FLETCHER, JR.           ROBERT GOTTSCHALK
Attesting Officer                 Commissioner of Patents

UNITED STATES PATENT OFFICE
CERTIFICATE OF CORRECTION

Patent No. 3,574,955                 Dated April 13, 1971

Inventor(s) Leonard Skolnick

It is certified that error appears in the above-identified patent and that said Letters Patent are hereby corrected as shown below:

On the cover sheet, [73] "Planetaria, Inc., Yorklyn, Del." should read -- Spitx Laboratories, Inc., Yorklyn, Del. --.

Signed and sealed this 24th day of October 1972.

(SEAL)
Attest:

EDWARD M. FLETCHER, JR.                   ROBERT GOTTSCHALK
Attesting Officer                            Commissioner of Patents